United States Patent
Yu et al.

(10) Patent No.: US 11,061,660 B2
(45) Date of Patent: Jul. 13, 2021

(54) METHOD FOR AUTHENTICATING AND UPDATING EUICC FIRMWARE VERSION AND RELATED APPARATUS

(71) Applicant: Huawei Technologies Co., Ltd., Shenzhen (CN)

(72) Inventors: Xiaobo Yu, Shenzhen (CN); Shuiping Long, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 33 days.

(21) Appl. No.: 16/620,406

(22) PCT Filed: Jun. 7, 2017

(86) PCT No.: PCT/CN2017/087425
§ 371 (c)(1),
(2) Date: Dec. 6, 2019

(87) PCT Pub. No.: WO2018/223309
PCT Pub. Date: Dec. 13, 2018

(65) Prior Publication Data
US 2020/0089488 A1    Mar. 19, 2020

(51) Int. Cl.
*H04W 8/18* (2009.01)
*H04L 29/06* (2006.01)
(Continued)

(52) U.S. Cl.
CPC .............. *G06F 8/65* (2013.01); *G06F 16/148* (2019.01); *G06F 21/44* (2013.01); *H04L 9/3268* (2013.01); *H04L 67/34* (2013.01); *H04W 8/18* (2013.01)

(58) Field of Classification Search
CPC ...... H04W 8/205; H04W 8/183; H04W 12/06; H04W 12/35; H04W 12/04; H04W 4/50;
(Continued)

(56) References Cited

U.S. PATENT DOCUMENTS 10,664,257 B2 *  5/2020  Li .............................. G06F 8/65
10,887,318 B2 *  1/2021  Lee ..................... H04L 63/0876
(Continued)

FOREIGN PATENT DOCUMENTS

CN    104168327 A    11/2014
CN    104396289 A    3/2015
(Continued)

OTHER PUBLICATIONS

Park et al., Secure Profile Provisioning Architecture for Embedded UICC, 7 pages (Year: 2013).*
(Continued)

*Primary Examiner* — Thuy Dao
(74) *Attorney, Agent, or Firm* — Conley Rose, P.C.

(57) ABSTRACT

A method for authenticating and updating an embedded universal integrated circuit card (eUICC) firmware version includes receiving first information from a terminal device, where the first information includes a target identifier, searching a currently stored event record for a target event record, where a group event identifier in the target event record matches the target identifier in the first information, sending the target event record to the terminal device, where the target event record is used to enable the terminal device to download an eUICC firmware version update package, and updating a firmware version of an eUICC of the terminal device based on the eUICC firmware version update package.

20 Claims, 17 Drawing Sheets

(51) Int. Cl.
*H04W 8/20* (2009.01)
*H04W 12/06* (2021.01)
*H04B 1/3816* (2015.01)
*G06F 8/65* (2018.01)
*G06F 16/14* (2019.01)
*G06F 21/44* (2013.01)
*H04L 9/32* (2006.01)
*H04L 29/08* (2006.01)

(58) Field of Classification Search
CPC .......... H04W 4/60; H04W 8/18; H04L 67/34; G06F 21/64; G06F 21/44; G06F 16/148; G06F 8/65
See application file for complete search history.

(56) References Cited

U.S. PATENT DOCUMENTS

| | | |
|---|---|---|
| 2014/0004827 A1 | 1/2014 | O'Leary |
| 2014/0038563 A1 | 2/2014 | O'Leary |
| 2014/0349617 A1 | 11/2014 | Li et al. |
| 2016/0246585 A1 | 8/2016 | Li et al. |
| 2016/0277930 A1 | 9/2016 | Li et al. |
| 2017/0041284 A1 | 2/2017 | Chen et al. |
| 2017/0118679 A1 | 4/2017 | Li et al. |
| 2017/0142121 A1 | 5/2017 | Lee et al. |

FOREIGN PATENT DOCUMENTS

| | | |
|---|---|---|
| CN | 105794241 A | 7/2016 |
| CN | 105916133 A | 8/2016 |
| CN | 106789373 A | 5/2017 |
| CN | 106790724 A | 5/2017 |

OTHER PUBLICATIONS

"RSP Technical Specification," Version 2.1.0, Jan. 25, 2017, 323 pages.

* cited by examiner

METHOD FOR AUTHENTICATING AND UPDATING EUICC FIRMWARE VERSION AND RELATED APPARATUS

CROSS-REFERENCE TO RELATED APPLICATIONS

This application is a U.S. National Stage of International Patent Application No. PCT/CN2017/087425 filed on Jun. 7, 2017, which is hereby incorporated by reference in its entirety.

TECHNICAL FIELD

This application relates to the field of telecommunications smartcards, and in particular, to a method for authenticating and updating an eUICC firmware version and a related apparatus.

BACKGROUND

An embedded universal integrated circuit card (embedded Universal Integrated Circuit Card, eUICC) is a third-generation telecommunications smartcard, and can perform remote profile management in a secure manner, or perform local profile management (for example, profile activation, deactivation, deletion, or the like that is triggered by a user of a terminal device). The term eUICC is derived from an embedded (embedded) UICC. The eUICC may be embedded in the terminal device in a form of a single chip or as a part of another single chip in the terminal device. However, it does not mean that the eUICC needs to be embedded in the terminal device and cannot be moved. The eUICC may be in a form of a removable card as a subscriber identification module (Subscriber Identification Module. SIM) card, a micro SIM card, or a nano-SIM card.

In an architecture of an eUICC remote management-configuration system, a remote server includes a server that provides a service for a terminal device or interacts with a terminal device, such as a subscription manager-data preparation+(Subscription Manager Data Preparation+, SM-DP+) server, a subscription manager-discovery (Subscription Manager Discovery Service, SM-DS) server, and an operating system patch server (Operation System Patch Server, OPS). The SM-DS is also referred to as an event management server, and may be configured to: perform event registration based on an event registration request of another remote server, and send a corresponding event record to the terminal device when the terminal device initiates query, so that the terminal device establishes a connection to a corresponding remote server by using an address of the remote server in the event record, and performs a corresponding operation, where an event includes but is not limited to a subscription information set (Profile) download event and a remote profile management (Remote Profile Management, RPM) event. Currently, event registration and distribution of the SM-DS server are in a one-to-one correspondence. To be specific, one event record corresponds to only one eUICC. When one service corresponds to a plurality of eUICCs, for example, the service is an eUICC firmware version update service, a remote server that provides the eUICC firmware version update service needs to separately initiate a plurality of event registration requests to the SM-DS, so that the SM-DS separately registers a plurality of event records for the plurality of eUICCs. This is relatively cumbersome. In addition, when one terminal device includes two or more eUICCs and the two or more eUICCs simultaneously establish connections to a same remote server, the two or more eUICCs need to separately perform eUICC bidirectional authentication with the remote server, and efficiency is relatively low.

SUMMARY

This application provides a method for authenticating and updating an eUICC firmware version and a related apparatus, to simplify an event registration process and a bidirectional authentication process in a process of providing an eUICC firmware version update service, thereby improving efficiency.

A first aspect of embodiments of this application provides a method for updating an eUICC firmware version, including:

receiving first information sent by a terminal device, where the first information includes a target identifier;

searching currently stored event records for a target event record, where a group event identifier in the target event record matches the target identifier in the first information, and the group event identifier includes at least one eUICC firmware version and at least one issuer identifier; and sending the target event record to the terminal device, where the target event record is used to enable the terminal device to download an eUICC firmware version update package.

According to the first aspect of the embodiments of this application, the target event record stores the group event identifier. One group event identifier may be corresponding to a plurality of eUICCs, to be specific, the target event record may be sent to the plurality of eUICCs corresponding to the group event identifier, so that an eUICC corresponding to the group event identifier downloads an eUICC firmware version update package, and an eUICC firmware version update service is performed for a plurality of eUICCs. In this way, the group event identifier resolves a problem that a plurality of events need to be registered during event registration.

In a first possible implementation of the first aspect, before the receiving first information sent by a terminal device, the method further includes: receiving an event registration request sent by an update server, where the event registration request carries the group event identifier; and storing the group event identifier in an event record based on the event registration request.

In a second possible implementation of the first aspect, the group event identifier further includes a custom identifier or a country code.

In a third possible implementation of the first aspect, the target identifier includes at least one of the following information: an eUICC firmware version, an issuer identifier, a custom identifier, or a country code.

In a fourth possible implementation of the first aspect, the custom identifier includes additional issuer information or a personal identification number in a preset custom bit.

In a fifth possible implementation of the first aspect, the target identifier includes a first target identifier of a first eUICC and a second target identifier of a second eUICC; and the searching currently stored event records for a target event record includes: separately searching the currently stored event records for a first event record and a second event record, where a group event identifier in the first event record matches the first target identifier, and a group event identifier in the second event record matches the second target identifier; and the sending the target event record to the terminal device includes: sending the first event record and the second event record to the terminal device, where the first event record is used to enable the terminal device to download a first eUICC firmware version update package of the first eUICC, and the second event record is used to enable the terminal device to download a second eUICC firmware version update package of the second eUICC.

A second aspect of the embodiments of this application provides another method for updating an eUICC firmware version, including:

sending first information to an event management server, where the first information includes a target identifier;

receiving a target event record that is obtained by the event management server through querying and that is sent by the event management server, where a group event identifier in the target event record matches the target identifier in the first information, and the group event identifier includes at least one eUICC firmware version and at least one issuer identifier;

downloading an eUICC firmware version update package based on the target event record; and updating a firmware version of an eUICC based on the eUICC firmware version update package.

According to the second aspect of the embodiments of this application, the eUICC firmware version update package is downloaded based on the target event record, and the firmware version of the eUICC is updated, to implement updating of the eUICC firmware version.

In a first possible implementation of the second aspect, the group event identifier may further include a custom identifier or a country code.

In a second possible implementation of the second aspect, the target identifier includes at least one of the following information: an eUICC firmware version, an issuer identifier, a custom identifier, or a country code.

In a third possible implementation of the second aspect, the custom identifier includes additional issuer information or a personal identification number in a preset custom bit.

In a fourth possible implementation of the second aspect, the target identifier includes a first target identifier of a first eUICC and a second target identifier of a second eUICC; the receiving a target event record that is obtained by the event management server through querying and that is sent by the event management server includes: receiving a first event record and a second event record that are obtained by the event management server through querying and that are sent by the event management server, where a group event identifier in the first event record matches the first target identifier, and a group event identifier in the second event record matches the second target identifier the downloading an eUICC firmware version update package based on the target event record includes: downloading a first eUICC firmware version update package of the first eUICC based on the first event record, and downloading a second eUICC firmware version update package of the second eUICC based on the second event record; and the updating a firmware version of an eUICC based on the eUICC firmware version update package includes: updating a firmware version of the first eUICC based on the first eUICC firmware version update package, and updating a firmware version of the second eUICC based on the second eUICC firmware version update package.

In a fifth possible implementation of the second aspect, the downloading an eUICC firmware version update package based on the target event record includes: extracting an address of an update server from the target event record; sending a current eUICC firmware version to the update server; and receiving the eUICC firmware version update package that is sent by the update server based on the current eUICC firmware version.

In a sixth possible implementation of the second aspect, before the receiving the eUICC firmware version update package that is sent by the update server based on the current eUICC firmware version, the method further includes: sending second information to the update server, where the second information includes the target identifier; and the receiving the eUICC firmware version update package that is sent by the update server based on the current eUICC firmware version includes: receiving the eUICC firmware version update package that is sent by the update server based on the current eUICC firmware version when the target identifier in the second information matches a group event identifier stored in the update server.

In a seventh possible implementation of the second aspect, after the updating a firmware version of an eUICC based on the eUICC firmware version update package, the method further includes: updating an eUICC firmware version in eUICC information.

In an eighth possible implementation of the second aspect, the updating an eUICC firmware version in eUICC information includes: updating the eUICC firmware version in the eUICC information based on first data in the eUICC firmware version update package, where the first data includes a target firmware version.

In a ninth possible implementation of the second aspect, after the sending a current firmware version to the update server, the method further includes: receiving second data sent by the update server, where the second data includes a target firmware version; and the updating an eUICC firmware version in eUICC information includes: updating the eUICC firmware version in the eUICC information based on the second data.

A third aspect of the embodiments of this application provides still another method for updating an eUICC firmware version, including:

sending first information to an event management server, where the first information includes a target identifier;

receiving a target event record that is obtained by the event management server through querying and that is sent by the event management server, where a group event identifier in the target event record matches the target identifier in the first information, and the group event identifier includes at least one eUICC firmware version and at least one issuer identifier;

downloading an eUICC firmware version update package based on the target event record; and sending the eUICC firmware version update package to an eUICC, where the eUICC firmware version update package is used by the eUICC to update a firmware version of the eUICC.

According to the third aspect of the embodiments of this application, the eUICC firmware version update package is downloaded based on the target event record, and the eUICC firmware version update package is sent to the eUICC, so that the eUICC completes updating of the firmware version of the eUICC.

In a first possible implementation of the third aspect, the target identifier includes a first target identifier of a first eUICC and a second target identifier of a second eUICC; the receiving a target event record that is obtained by the event management server through querying and that is sent by the event management server includes: receiving a first event record and a second event record that are obtained by the event management server through querying and that are sent by the event management server, where a group event identifier in the first event record matches the first target identifier, and a group event identifier in the second event record matches the second target identifier; the downloading an eUICC firmware version update package based on the target event record includes: downloading a first eUICC firmware version update package of the first eUICC based on the first event record, and downloading a second eUICC firmware version update package of the second eUICC based on the second event record; and the sending the eUICC firmware version update package to an eUICC includes: sending the first eUICC firmware version update package to the first eUICC, where the first eUICC firmware version update package is used by the first eUICC to update an eUICC firmware version of the first eUICC; and sending the second eUICC firmware version update package to the second eUICC, where the second eUICC firmware version update package is used by the second eUICC to update an eUICC firmware version of the second eUICC.

In a second possible implementation of the third aspect, before the downloading a first eUICC firmware version update package of the first eUICC based on the first event record, the method further includes: sending the first event record to the first eUICC based on a first eUICC identifier; and before the downloading a second eUICC firmware version update package of the second eUICC based on the second event record, the method further includes: obtaining a second eUICC identifier of the second eUICC, and sending the second event record to the second eUICC based on the second eUICC identifier.

In a third possible implementation of the third aspect, the downloading a first eUICC firmware version update package of the first eUICC based on the first event record includes: when downloading the first eUICC firmware version update package of the first eUICC based on the first event record, receiving the first eUICC identifier sent by an update server corresponding to the first eUICC; the downloading a second eUICC firmware version update package of the second eUICC based on the second event record includes: when downloading the second eUICC firmware version update package of the second eUICC based on the second event record, further receiving the second eUICC identifier sent by an update server corresponding to the second eUICC; the sending the first eUICC firmware version update package to the first eUICC includes: sending the first eUICC firmware version update package to the first eUICC based on the first eUICC identifier; and the sending the second eUICC firmware version update package to the second eUICC includes: sending the second eUICC firmware version update package to the second eUICC based on the second eUICC identifier.

A fourth aspect of the embodiments of this application provides still another method for updating an eUICC firmware version, including:

sending an event registration request to an event management server, where the event registration request carries a group event identifier, the group event identifier includes at least one eUICC firmware version and at least one issuer identifier, and the event registration request is used to enable the event management server to: store the group event identifier in an event record, and send the event record to a terminal device when receiving first information that is sent by the terminal device and that matches the group event identifier.

According to the fourth aspect of the embodiments of this application, the event registration request carries the group event identifier, and the group event identifier includes the at least one eUICC firmware version and the at least one issuer identifier. Both an eUICC firmware version and an issuer identifier may be corresponding to a plurality of eUICCs, and only one event can be registered for a plurality of eUICCs, to resolve a problem that a plurality of events need to be registered because a service is to be provided for a plurality of terminal devices.

In a first possible implementation of the fourth aspect, after the sending an event registration request to an event management server, the method further includes: receiving a current eUICC firmware version, of the terminal device, that is sent by the terminal device; determining, based on the current eUICC firmware version, an eUICC firmware version update package required for updating an eUICC of the terminal device to a target firmware version; and sending the eUICC firmware version update package to the terminal device, where the eUICC firmware version update package is used by the terminal device to update a firmware version of the eUICC of the terminal device.

In a second possible implementation of the fourth aspect, the determining, based on the current eUICC firmware version, an eUICC firmware version update package required for updating an eUICC of the terminal device to a target firmware version includes: receiving second information sent by the terminal device, where the second information includes eUICC performance and an eUICC firmware version; and when determining that the eUICC performance and the eUICC firmware version meet a performance requirement and a firmware version requirement of the target firmware version, determining, based on the current eUICC firmware version, the eUICC firmware version update package required for updating the eUICC of the terminal device to the target firmware version.

In a third possible implementation of the fourth aspect, the second information further includes a target identifier, and before the determining, based on the current eUICC firmware version, the eUICC firmware version update package required for updating the eUICC of the terminal device to the target firmware version, the method further includes: when the target identifier in the second information matches a locally stored group event identifier, determining whether the eUICC performance and the eUICC firmware version can meet the performance requirement and the firmware version requirement of the target firmware version.

A fifth aspect of the embodiments of this application provides a bidirectional authentication method, including:

receiving first eUICC information of a first eUICC of a terminal device and second eUICC information of a second eUICC of the terminal device;

determining target verification information based on the first eUICC information and the second eUICC information;

sending first authentication information to the terminal device, where the first authentication information includes the target verification information;

receiving second authentication information sent by the terminal device after the first authentication information is verified by the first eUICC and the second eUICC; and verifying the second authentication information based on the target verification information.

According to the fifth aspect of the embodiments of this application, the two eUICCs of the terminal device can concurrently perform bidirectional authentication with the remote server after a communication connection between the remote server and the terminal device is established only once, so that after the bidirectional authentication is completed, operations on the eUICCs can be separately completed, thereby improving operation efficiency.

In a first possible implementation of the fifth aspect, the target verification information includes a target signature public key identifier, the first eUICC information includes a first signature public key identifier list of the first eUICC, and the second eUICC information includes a second signature public key identifier list of the second eUICC; and the determining target verification information based on the first eUICC information and the second eUICC information includes: selecting a first target signature public key identifier from the first signature public key identifier list, where the first target signature public key identifier is also in a local certificate issuer public key identifier list; selecting a second target signature public key identifier from the second signature public key identifier list, where the second target signature public key identifier is also in the local certificate issuer public key identifier list; and determining the first target signature public key identifier and the second target signature public key identifier as target signature public key identifiers.

In a second possible implementation of the fifth aspect, when the first signature public key identifier list and the second signature public key identifier list include a same signature public key identifier, the same signature public key identifier is determined as the target signature public key identifier, where the same signature public key identifier is also in the local certificate issuer public key identifier list.

In a third possible implementation of the fifth aspect, the target verification information includes a target verification certificate, the first eUICC information includes a first verification public key identifier list of the first eUICC, and the second eUICC information includes a second verification public key identifier list of the second eUICC; and the determining target verification information based on the first eUICC information and the second eUICC information includes: selecting a first target verification public key identifier from the first verification public key identifier list, where the first target verification public key identifier is also in the local certificate issuer public key identifier list; selecting a second target verification public key identifier from the second verification public key identifier list, where the second target verification public key identifier is also in the local certificate issuer public key identifier list; and determining a first target verification certificate corresponding to the first target verification public key identifier and a second target verification certificate corresponding to the second target verification public key identifier as target verification certificates.

In a fourth possible implementation of the fifth aspect, when the first verification public key identifier list and the second verification public key identifier list include a same verification public key identifier, a verification certificate corresponding to the same verification public key identifier is determined as the target verification certificate, where the same verification signature public key identifier is also in the local certificate issuer public key identifier list.

A sixth aspect of the embodiments of this application provides another bidirectional authentication method, including:

sending first eUICC information of a first eUICC and second eUICC information of a second eUICC to a remote server;

receiving first authentication information sent by the remote server, where the first authentication information includes target verification information;

when the first authentication information is verified by the first eUICC and the second eUICC, sending second authentication information to the remote server, where the second authentication information includes first authentication sub-information sent by the first eUICC and second authentication sub-information sent by the second eUICC.

According to the fifth aspect of the embodiments of this application, the two eUICCs can simultaneously perform bidirectional authentication with the remote server, thereby saving time and improving bidirectional authentication efficiency.

In a first possible implementation of the sixth aspect, before the sending first eUICC information of a first eUICC and second eUICC information of a second eUICC to a remote server, the method further includes: obtaining the first eUICC information from the first eUICC, and obtaining the second eUICC information from the second eUICC.

In a second possible implementation of the sixth aspect, before the sending second authentication information to the remote server, the method further includes: obtaining third authentication sub-information corresponding to the first eUICC from the first authentication information, and sending the third authentication sub-information to the first eUICC; receiving the first authentication sub-information that is sent by the first eUICC after the third authentication sub-information is verified by the first eUICC; obtaining fourth authentication sub-information corresponding to the second eUICC from the first authentication information, and sending the fourth authentication sub-information to the second eUICC; and receiving the second authentication sub-information that is sent by the second eUICC after the fourth authentication sub-information is verified by the second eUICC.

In a third possible implementation of the sixth aspect, the target verification information includes a first target signature public key identifier and a second target signature public key identifier, the first target signature public key identifier is selected by the remote server from a first signature public key identifier list of the first eUICC, the first target signature public key identifier is also in a local certificate issuer public key identifier list of the remote server, the second target signature public key identifier is selected by the remote server from a second signature public key identifier list of the second eUICC, and the second target signature public key identifier is also in the local certificate issuer public key identifier list; and the third authentication sub-information carries the first target signature public key identifier, and the fourth authentication sub-information carries the second target signature public key identifier.

In a fourth possible implementation of the sixth aspect, the target verification information includes a target signature public key identifier, and the target signature public key identifier is in each of a first signature public key identifier list of the first eUICC, a second signature public key identifier list of the second eUICC, and a local certificate issuer public key identifier list of the remote server; and both the third authentication sub-information and the fourth authentication sub-information carry the target signature public key identifier.

In a fifth possible implementation of the sixth aspect, the target verification information includes a first target verification certificate corresponding to a first target verification public key identifier and a second target verification certificate corresponding to a second target verification public key identifier, the first target verification public key identifier is selected by the remote server from a first verification public key identifier list of the first eUICC, the first target verification public key identifier is also in the local certificate issuer public key identifier list of the remote server, the second target verification public key identifier is selected by the remote server from a second verification public key identifier list of the second eUICC, and the second target verification public key identifier is also in the local certificate issuer public key identifier list; and the third authentication sub-information carries the first target verification certificate, and the fourth authentication sub-information carries the second target verification certificate.

In a sixth possible implementation of the sixth aspect, the target verification information includes a target verification certificate, and the target verification certificate is a verification certificate corresponding to a target verification public key identifier that is in each of the first verification public key identifier list of the first eUICC, the second verification public key identifier list of the second eUICC, and the local certificate issuer public key identifier list of the remote server; and both the third authentication sub-information and the fourth authentication sub-information carry the target verification certificate.

A seventh aspect of the embodiments of this application provides an event management server. The event management server has a function of implementing the method in the first aspect. The function may be implemented by using hardware, or may be implemented by hardware by executing corresponding software. The hardware or software includes one or more modules corresponding to the foregoing function.

In a possible design, the event management server includes a receiving module, a processing module, and a sending module; the receiving module is configured to receive first information sent by a terminal device, where the first information includes a target identifier; the processing module is configured to search currently stored event records for a target event record, where a group event identifier in the target event record matches the target identifier in the first information, and the group event identifier includes at least one eUICC firmware version and at least one issuer identifier; and the sending module is configured to send the target event record to the terminal device, where the target event record is used to enable the terminal device to download an eUICC firmware version update package.

In a possible implementation, the receiving module is further configured to receive an event registration request sent by an update server, where the event registration request carries the group event identifier; and processing module is further configured to store the group event identifier in an event record based on the event registration request.

In a possible implementation, the group event identifier further includes a custom identifier or a country code.

In a possible implementation, the target identifier includes at least one of the following information: an eUICC firmware version, an issuer identifier, a custom identifier, or a country code.

In a possible implementation, the target identifier includes a first target identifier of a first eUICC and a second target identifier of a second eUICC; the processing module is specifically configured to separately search the currently stored event records for a first event record and a second event record, where a group event identifier in the first event record matches the first target identifier, and a group event identifier in the second event record matches the second target identifier; and send the first event record and the second event record to the terminal device, where the first event record is used to enable the terminal device to download a first eUICC firmware version update package of the first eUICC, and the second event record is used to enable the terminal device to download a second eUICC firmware version update package of the second eUICC.

In a possible design, the event management server includes a processor and a transceiver; the transceiver is configured to receive first information sent by a terminal device, where the first information includes a target identifier; the processor is configured to search currently stored event records for a target event record, where a group event identifier in the target event record matches the target identifier in the first information, and the group event identifier includes at least one eUICC firmware version and at least one issuer identifier; and the transceiver is further configured to send the target event record to the terminal device, where the target event record is used to enable the terminal device to download an eUICC firmware version update package.

Based on a same invention concept, for a problem resolving principle and beneficial effects of the event management server, refer to the method and beneficial effects according to the first aspect, and for an implementation of the event management server, refer to an implementation of the method according to the first aspect. Repeated descriptions are not described again.

An eighth aspect of the embodiments of this application provides a terminal device. The terminal device has a function of implementing the method in the second aspect. The function may be implemented by using hardware, or may be implemented by hardware by executing corresponding software. The hardware or software includes one or more modules corresponding to the foregoing function.

In a possible design, the terminal device includes a sending module, a receiving module, and a processing module; the sending module is configured to send first information to an event management server, where the first information includes a target identifier; the receiving module is configured to receive a target event record that is obtained by the event management server through querying and that is sent by the event management server, where a group event identifier in the target event record matches the target identifier in the first information, and the group event identifier includes at least one eUICC firmware version and at least one issuer identifier; the processing module is configured to download an eUICC firmware version update package based on the target event record; and the processing module is further configured to update a firmware version of an eUICC based on the eUICC firmware version update package.

In a possible implementation, the group event identifier further includes a custom identifier or a country code.

In a possible implementation, the target identifier includes at least one of the following information: an eUICC firmware version, an issuer identifier, a custom identifier, or a country code.

In a possible implementation, the custom identifier includes additional issuer information or a personal identification number in a preset custom bit.

In a possible implementation, the target identifier includes a first target identifier of a first eUICC and a second target identifier of a second eUICC; the receiving module is specifically configured to receive a first event record and a second event record that are obtained by the event management server 90 through querying and that are sent by the event management server 90, where a group event identifier in the first event record matches the first target identifier, and a group event identifier in the second event record matches the second target identifier; and the processing module is specifically configured to: download a first eUICC firmware version update package of the first eUICC based on the first event record, download a second eUICC firmware version update package of the second eUICC based on the second event record, update a firmware version of the first eUICC based on the first eUICC firmware version update package, and update a firmware version of the second eUICC based on the second eUICC firmware version update package.

In a possible implementation, the processing module is specifically configured to extract an address of an update server from the target event record; the sending module is further configured to send a current eUICC firmware version to the update server; and the receiving module is further configured to receive the eUICC firmware version update package that is sent by the update server based on the current eUICC firmware version.

In a possible implementation, the sending module is further configured to send second information to the update server, where the second information includes the target identifier; and the receiving module is specifically configured to receive the eUICC firmware version update package that is sent by the update server based on the current eUICC firmware version when the target identifier in the second information matches a group event identifier stored in the update server.

In a possible implementation, the processing module is specifically configured to update an eUICC firmware version in eUICC information based on first data in the eUICC firmware version update package, where the first data includes a target firmware version.

In a possible implementation, the receiving module is further configured to receive second data sent by the update server, where the second data includes a target firmware version; and the processing module is further configured to update an eUICC firmware version in eUICC information based on the second data.

In a possible design, the terminal device includes a processor and a transceiver; the transceiver is configured to send first information to an event management server, where the first information includes a target identifier; the transceiver is further configured to receive a target event record that is obtained by the event management server through querying and that is sent by the event management server, where a group event identifier in the target event record matches the target identifier in the first information, and the group event identifier includes at least one eUICC firmware version and at least one issuer identifier; the processor is configured to download an eUICC firmware version update package based on the target event record; and the processor is further configured to update a firmware version of an eUICC based on the eUICC firmware version update package.

Based on a same invention concept, for a problem resolving principle and beneficial effects of the terminal device, refer to the method and beneficial effects according to the second aspect, and for an implementation of the terminal device, refer to an implementation of the method according to the second aspect. Repeated descriptions are not described again.

A ninth aspect of the embodiments of this application provides a local file assistant, including:

a sending module, configured to send first information to an event management server, where the first information includes a target identifier;

a receiving module, configured to receive a target event record that is obtained by the event management server through querying and that is sent by the event management server, where a group event identifier in the target event record matches the target identifier in the first information;

a processing module, configured to download an eUICC firmware version update package based on the target event record, where the sending module is further configured to send the eUICC firmware version update package to an eUICC, where the eUICC firmware version update package is used by the eUICC to update a firmware version of the eUICC.

The local profile assistant provided in the ninth aspect of the embodiments of this application is configured to perform the method for updating an eUICC firmware version according to the third aspect of this application. For details, refer to descriptions of the third aspect of the embodiments of this application. Details are not repeated herein again.

In a possible design, the local file assistant may be deployed on a hardware module of a terminal device as one or more software modules, an application program code corresponding to the local file assistant is stored in a memory of the terminal device, and the application program code may be executed by a processor of the terminal device to implement a function of the local file assistant.

A tenth aspect of the embodiments of this application provides an update server. The update server has a function of implementing the method in the fourth aspect. The function may be implemented by using hardware, or may be implemented by hardware by executing corresponding software. The hardware or software includes one or more modules corresponding to the foregoing function.

In a possible design, the update server includes a sending module, and the sending module is configured to send an event registration request to an event management server, where the event registration request carries a group event identifier, the group event identifier includes at least one eUICC firmware version and at least one issuer identifier, and the event registration request is used to enable the event management server to: store the group event identifier in an event record, and send the event record to a terminal device when receiving first information that is sent by the terminal device and that matches the group event identifier.

In a possible implementation, the update server further includes: a receiving module, configured to receive a current eUICC firmware version, of the terminal device, that is sent by the terminal device; and a processing module, configured to determine, based on the current eUICC firmware version, an eUICC firmware version update package required for updating an eUICC of the terminal device to a target firmware version, where the sending module is further configured to send the eUICC firmware version update package to the terminal device, and the eUICC firmware version update package is used by the terminal device 100 to update a firmware version of the eUICC of the terminal device.

In a possible implementation, the receiving module is further configured to receive second information sent by the terminal device 100, where the second information includes eUICC performance and an eUICC firmware version; and the processing module is specifically configured to: when determining that the eUICC performance and the eUICC firmware version meet a performance requirement and a firmware version requirement of the target firmware version, determine, based on the current eUICC firmware version, the eUICC firmware version update package required for updating the eUICC of the terminal device 100 to the target firmware version.

In a possible implementation, the second information further includes a target identifier, and the processing module is further configured to: when the target identifier in the second information matches a locally stored group event identifier, determine whether the eUICC performance and the eUICC firmware version can meet the performance requirement and the firmware version requirement of the target firmware version.

In a possible design, a structure of the update server includes a processor and a transceiver, and the transceiver is configured to send an event registration request to an event management server, where the event registration request carries a group event identifier, the group event identifier includes at least one eUICC firmware version and at least one issuer identifier, and the event registration request is used to enable the event management server to: store the group event identifier in an event record, and send the event record to a terminal device when receiving first information that is sent by the terminal device and that matches the group event identifier.

Based on a same invention concept, for a problem resolving principle and beneficial effects of the update server, refer to the method and beneficial effects according to the fourth aspect, and for an implementation of the event management server, refer to an implementation of the method according to the fourth aspect. Repeated descriptions are not described again.

An eleventh aspect of the embodiments of this application provides a remote server. The remote server has a function of implementing the method in the fifth aspect. The function may be implemented by using hardware, or may be implemented by hardware by executing corresponding software. The hardware or software includes one or more modules corresponding to the foregoing function.

In a possible design, the remote server includes a receiving module, a processing module, and a sending module; the receiving module is configured to receive first eUICC information of a first eUICC of a terminal device and second eUICC information of a second eUICC of the terminal device; the processing module is configured to determine target verification information based on the first eUICC information and the second eUICC information; the sending module is configured to send first authentication information to the terminal device, where the first authentication information includes the target verification information; the receiving module is further configured to receive second authentication information sent by the terminal device after the first authentication information is verified by the first eUICC and the second eUICC; and the processing module is further configured to verify the second authentication information based on the target verification information.

In a possible implementation, the target verification information includes a target signature public key identifier, the first eUICC information includes a first signature public key identifier list of the first eUICC, and the second eUICC information includes a second signature public key identifier list of the second eUICC; and the processing module is specifically configured to: select a first target signature public key identifier from the first signature public key identifier list, where the first target signature public key identifier is also in a local certificate issuer public key identifier list; select a second target signature public key identifier from the second signature public key identifier list, where the second target signature public key identifier is also in the local certificate issuer public key identifier list; and determine the first target signature public key identifier and the second target signature public key identifier as target signature public key identifiers.

In a possible implementation, the processing module is further configured to: when the first signature public key identifier list and the second signature public key identifier list include a same signature public key identifier, determine the same signature public key identifier as the target signature public key identifier, where the same signature public key identifier is also in the local certificate issuer public key identifier list.

In a possible implementation, the target verification information includes a target verification certificate, the first eUICC information includes a first verification public key identifier list of the first eUICC, and the second eUICC information includes a second verification public key identifier list of the second eUICC; and the processing module is specifically configured to: select a first target verification public key identifier from the first verification public key identifier list, where the first target verification public key identifier is also in the local certificate issuer public key identifier list; select a second target verification public key identifier from the second verification public key identifier list, where the second target verification public key identifier is also in the local certificate issuer public key identifier list; and determine a first target verification certificate corresponding to the first target verification public key identifier and a second target verification certificate corresponding to the second target verification public key identifier as target verification certificates.

In a possible implementation, the processing module is further configured to: when the first verification public key identifier list and the second verification public key identifier list include a same verification public key identifier, determine a verification certificate corresponding to the same verification public key identifier as the target verification certificate, where the same verification signature public key identifier is also in the local certificate issuer public key identifier list.

In a possible design, a structure of the remote server includes a processor and a transceiver; the transceiver is configured to receive first eUICC information of a first eUICC of a terminal device and second eUICC information of a second eUICC of the terminal device; the processor is configured to determine target verification information based on the first eUICC information and the second eUICC information; the transceiver is further configured to send first authentication information to the terminal device, where the first authentication information includes the target verification information; the transceiver is further configured to receive second authentication information sent by the terminal device after the first authentication information is verified by the first eUICC and the second eUICC; and the processor is further configured to verify the second authentication information based on the target verification information.

Based on a same invention concept, for a problem resolving principle and beneficial effects of the remote server, refer to the method and beneficial effects according to the fifth aspect, and for an implementation of the event management server, refer to an implementation of the method according to the fifth aspect. Repeated descriptions are not described again.

A twelfth aspect of the embodiments of this application provides a local file assistant, including:

a sending module, configured to send first eUICC information of a first eUICC and second eUICC information of a second eUICC to a remote server; and a receiving module, configured to receive first authentication information sent by the remote server, where the first authentication information includes target verification information, where the sending module is further configured to: when the first authentication information is verified by the first eUICC and the second eUICC, send second authentication information to the remote server, where the second authentication information includes first authentication sub-information sent by the first eUICC and second authentication sub-information sent by the second eUICC.

The local profile assistant provided in the twelfth aspect of the embodiments of this application is configured to perform the bidirectional authentication method according to the sixth aspect of this application. For details, refer to descriptions of the sixth aspect of the embodiments of this application. Details are not repeated herein again.

In a possible design, the local file assistant may be deployed on a hardware module of a terminal device as one or more software modules, an application program code corresponding to the local file assistant is stored in a memory of the terminal device, and the application program code may be executed by a processor of the terminal device to implement a function of the local file assistant.

A thirteenth aspect of the embodiments of this application provides a computer storage medium, configured to store a computer program instruction used by a computer, and the computer program instruction includes a related program used for executing the first aspect.

A fourteenth aspect of the embodiments of this application provides a computer storage medium, configured to store a computer program instruction used by a computer, and the computer program instruction includes a related program used for executing the second aspect.

A fifteenth aspect of the embodiments of this application provides a computer storage medium, configured to store a computer program instruction used by a computer, and the computer program instruction includes a related program used for executing the third aspect.

A sixteenth aspect of the embodiments of this application provides a computer storage medium, configured to store a computer program instruction used by a computer, and the computer program instruction includes a related program used for executing the fourth aspect.

A seventeenth aspect of the embodiments of this application provides a computer storage medium, configured to store a computer program instruction used by a computer, and the computer program instruction includes a related program used for executing the fifth aspect.

An eighteenth aspect of the embodiments of this application provides a computer storage medium, configured to store a computer program instruction used by a computer, and the computer program instruction includes a related program used for executing the sixth aspect.

A nineteenth aspect of the embodiments of this application provides a computer program, configured to perform the methods provided in the first aspect.

A twentieth aspect of the embodiments of this application provides a computer program, configured to perform the methods provided in the second aspect.

A twenty-first aspect of the embodiments of this application provides a computer program, configured to perform the methods provided in the third aspect.

A twenty-second aspect of the embodiments of this application provides a computer program, configured to perform the methods provided in the fourth aspect.

A twenty-third aspect of the embodiments of this application provides a computer program, configured to perform the methods provided in the fifth aspect.

A twenty-fourth aspect of the embodiments of this application provides a computer program, configured to perform the methods provided in the sixth aspect.

BRIEF DESCRIPTION OF DRAWINGS

To describe the technical solutions in the embodiments of this application more clearly, the following briefly describes the accompanying drawings required for describing the embodiments.

DESCRIPTION OF EMBODIMENTS

The following clearly and completely describes the technical solutions in the embodiments of this application with reference to the accompanying drawings in the embodiments of this application.

Figure 1:
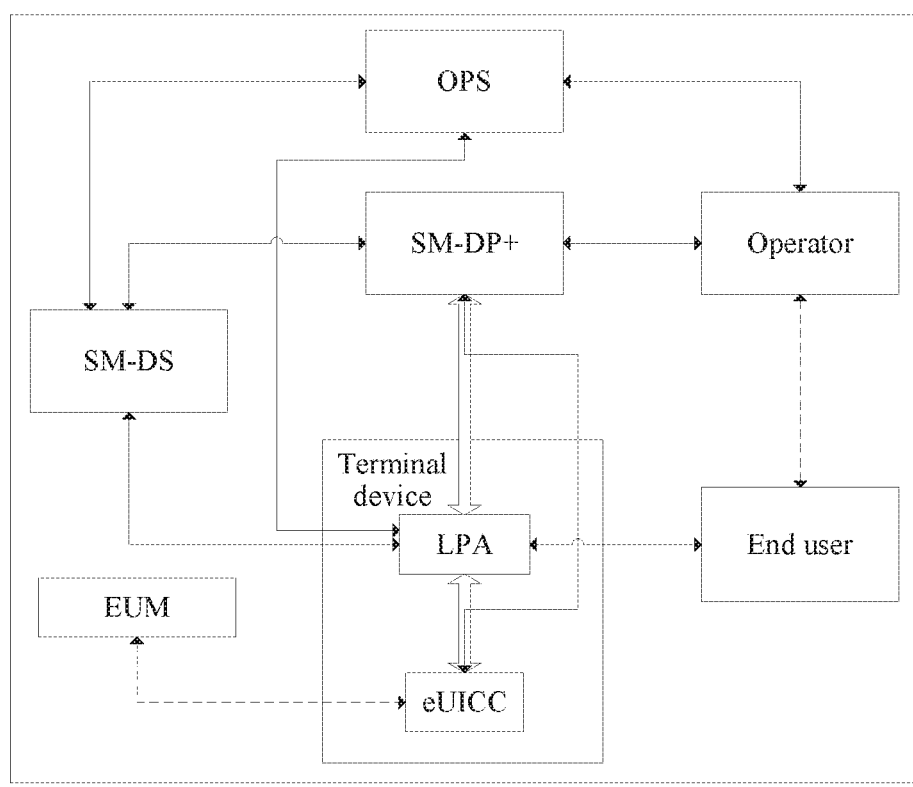
FIG. 1 is a schematic architectural diagram of an eUICC remote configuration/management system according to an embodiment of this application.

The technical solutions in the embodiments of this application are applicable to an eUICC remote management/configuration system. An architecture of the eUICC remote management/configuration system in the embodiments of this application may be shown in FIG. 1. FIG. 1 is a schematic architectural diagram of an eUICC remote configuration/management system according to an embodiment of this application. An SM-DP+ is responsible for preparing a profile package, and encrypts the profile package by using a key encryption key of a profile. The SM-DP+ binds the profile package encrypted with the key encryption key to an EID of a specified eUICC, and securely downloads the bound profile package to a terminal. In addition, the SM-DP+ may also execute remote profile management (Remote Profile management, RPM) and remote eUICC management (Remote eUICC Management, ReM). The SM-DP+ may be deployed on a server of an operator, an eUICC manufacturer, an original equipment manufacturer (Original Equipment Manufacturer, OEM), or another party. An OPS is configured to: prepare an eUICC firmware version update package, and send the prepared eUICC firmware version update package (for example, an eUICC firmware version incremental package or an eUICC firmware version full package) to the terminal device. An eUICC firmware version may be a remote SIM provisioning (Remote SIM Provisioning, RSP) version supported by an eUICC, or may be an eUICC platform version, or may be an eUICC operating system version, or may be an eUICC platform version and an eUICC operating system version. In addition, the eUICC firmware version may also include a JAVA platform version or an eUICC operating system version including a new feature (i.e. new algorithm). The eUICC firmware version may also include a TS102241 version and a global platform (globalplatform) version. An SM-DS is configured to provide one or more SM-DP+ addresses or OPS addresses to the terminal device. The terminal device may establish a connection to the SM-DP+ by using an SM-DP+ address, or the terminal device may establish a connection to the OPS by using an OPS address. The terminal device includes a local profile assistant (Local Profile Assitant, LPA), configured to establish a connection to the SM-DP+ to perform related management operations on a profile and an eUICC, such as downloading and installation, remote profile management and remote eUICC management, and eUICC firmware version update. The terminal device further includes an eUICC, configured to implement various functions of a SIM card, a profile configuration and management function, and an eUICC configuration and management function. An operator is a service support system of an operator, and is responsible for subscribing to a profile from the SM-DP+ and requesting to manage a profile on an eUICC. An end user (End User) is a user/user of the terminal device. The eUICC manufacturer (eUICC Manufacturer, EUM) is a manufacturer of an eUICC. The SM-DP+, the SM-DS, and the OPS may all be referred to as eUICC remote servers (or remote SIM configuration servers). In a possible manner, the SM-DP+ and the OPS may be deployed on a same server.

The terminal device mentioned in the embodiments of this application may be a device that provides a user with voice and/or data connectivity, a handheld device with a radio connection function, or another processing device connected to a radio modem. The terminal device may communicate with one or more core networks through a radio access network (Radio Access Network, RAN). The terminal device may be a mobile terminal, such as a mobile phone (also referred to as a "cellular" phone) and a computer with a mobile terminal, for example, may be a portable, pocket-sized, handheld, computer built-in, or vehicle-mounted mobile apparatus, which exchanges voice and/or data with the radio access network. For example, the terminal device may be a device such as a personal communication service (PCS, Personal Communication Service) phone, a cordless telephone set, a session initiation protocol (SIP) phone, a wireless local loop (WLL, Wireless Local Loop) station, or a personal digital assistant (PDA, Personal Digital Assistant). The terminal device may also be an internet of things device that is connected to a sensor network layer and a transport network layer and that collects data and sends data to a network layer. For example, the terminal device may be a device such as a refrigerator, an air conditioner, or a washing machine in a smart household system. The terminal device may also be referred to as a system, a subscriber unit (Subscriber Unit), a subscriber station (Subscriber Station), a mobile station (Mobile Station), a mobile console (Mobile), a remote station (Remote Station), an access point (Access Point), a remote terminal (Remote Terminal), an access terminal (Access Terminal), a user terminal (User Terminal), a user agent (User Agent), a user device (User Device), or user equipment (User Equipment).

Figure 2:
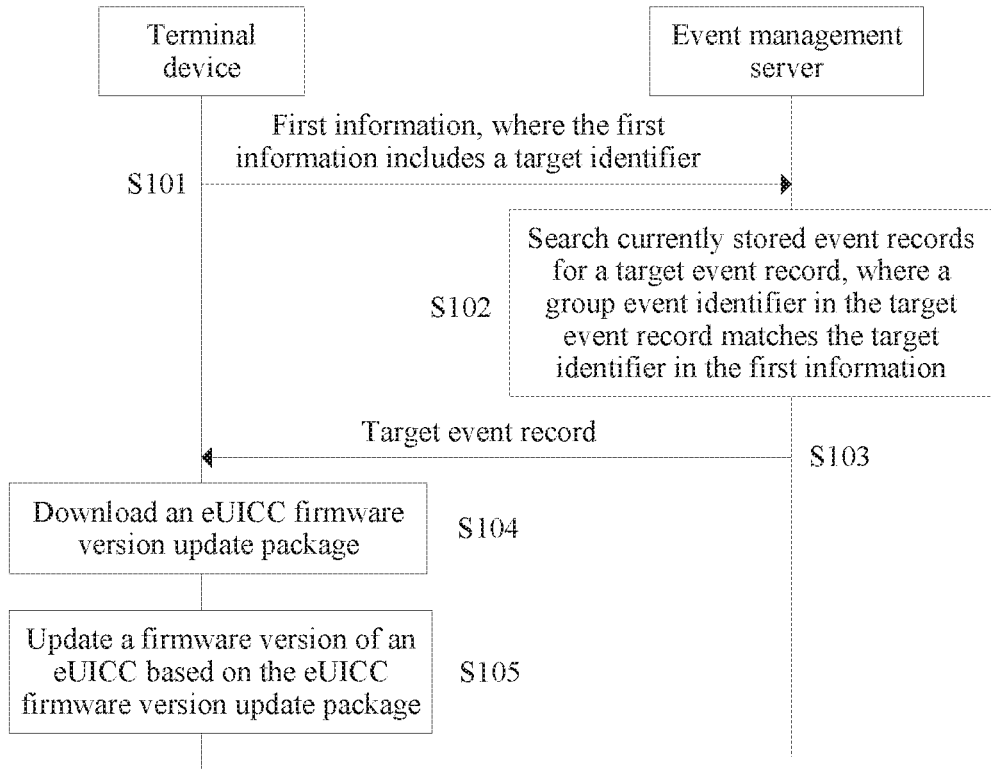
FIG. 2 is a schematic flowchart of a method for updating a firmware version according to an embodiment of this application.

FIG. 2 is a schematic flowchart of a method for updating a firmware version according to an embodiment of this application. As shown in the figure, the method includes the following steps.

S101. A terminal device sends first information to an event management server, where the first information includes a target identifier, and the event management server receives the first information.

Specifically, as shown in FIG. 1, the terminal device may include an LPA and an eUICC. The LPA and the eUICC may be two modules that are separated from each other and that have a physical or logical connection relationship. For example, the LPA is disposed on a baseband chip, an application processor, or another hardware module of the terminal device. Alternatively, the LPA may also be directly deployed on the eUICC. Specifically, the LPA may be a software module, or may be a plurality of software modules that are distributed and associated with each other.

Specifically, the event management server may be an SM-DS, or may be another server that has event management functions such as event registration, event deletion, event sending, and event modification, or may be a server that provides one or more SM-DP+ addresses or OPS addresses to the terminal device so that the terminal device establishes a communication connection to an SM-DS+ or an OPS.

S102. The event management server searches currently stored event records for a target event record, where a group event identifier in the target event record matches the target identifier in the first information, and the group event identifier includes at least one eUICC firmware version and at least one issuer identifier.

Optionally, there may be a plurality of event records stored in the event management server, for example, an event record corresponding to an eUICC 1, an event record corresponding to an eUICC 2, and an event record corresponding to an eUICC 3.

Optionally, an event record may be corresponding to an eUICC by using an eUICC identity (eUICC Identity, EID) or by using a group event identifier.

For example, when there is a one-to-one correspondence between the event record and the eUICC, the correspondence may be indicated by using the EID, to be specific, the EID is stored in the event record, and an eUICC that can match the EID in the event record is the eUICC corresponding to the event record. When there is a one-to-many correspondence between the event record and the eUICC, the correspondence may be indicated by using a group event identifier, to be specific, the group event identifier is stored in the event record, and an eUICC that can match the group event identifier in the event record is the eUICC corresponding to the event record.

Specifically, the group event identifier may be an identifier shared by a plurality of eUICCs, and the group event identifier is used to indicate that the target event record may be corresponding to a plurality of terminal devices or a plurality of eUICCs, and that a service provided by a remote server corresponding to the target event record may be corresponding to a plurality of terminal devices or a plurality of eUICCs.

Optionally, that the group event identifier matches the target identifier may indicate that the group event identifier is the same as the target identifier or the target identifier belongs to the group event identifier.

Specifically, the target event record may be registered by the event management server before the terminal device sends the first information to the event management server, to be specific, before the event management server receives the first information sent by the terminal device, the method further includes: The event management server receives an event registration request sent by an update server, where the registration request carries the group event identifier; and the event management server stores the group event identifier in the target event record based on the registration request.

In an optional implementation, the terminal may execute an operation of matching the group event identifier with an identifier locally stored in the terminal device, to be specific, the terminal device receives event records sent by the event management server, and the terminal device selects, from the event records, the target event record that matches the locally stored identifier. For example, the target identifier in the first information includes some group event identifiers. The event management server searches the currently stored event records for event records that match the target identifier. The event management server sends the found event records that match the target identifier to the terminal device. The terminal device extracts complete group event identifiers from the event records, and matches the group event identifiers with locally stored identification information one by one, to determine the target event record. In this implementation, the target identifier includes only a part of the group event identifier, and there may be one or more event records that match the target identifier. The terminal determines the target event record based on the received one or more event records. To be specific, in this implementation, the event server may perform preliminary filtering on the event records to screen out some event records that meet a condition, and then the terminal device performs final filtering on the event records to screen out the target event record whose group event identifier matches the identification information of the terminal device.

S103. The event management server sends the target event record to the terminal device, and the terminal device receives the target event record.

Optionally, the target event record may further include an address of the update server.

S104. The terminal device downloads an eUICC firmware version update package.

Figure 3:
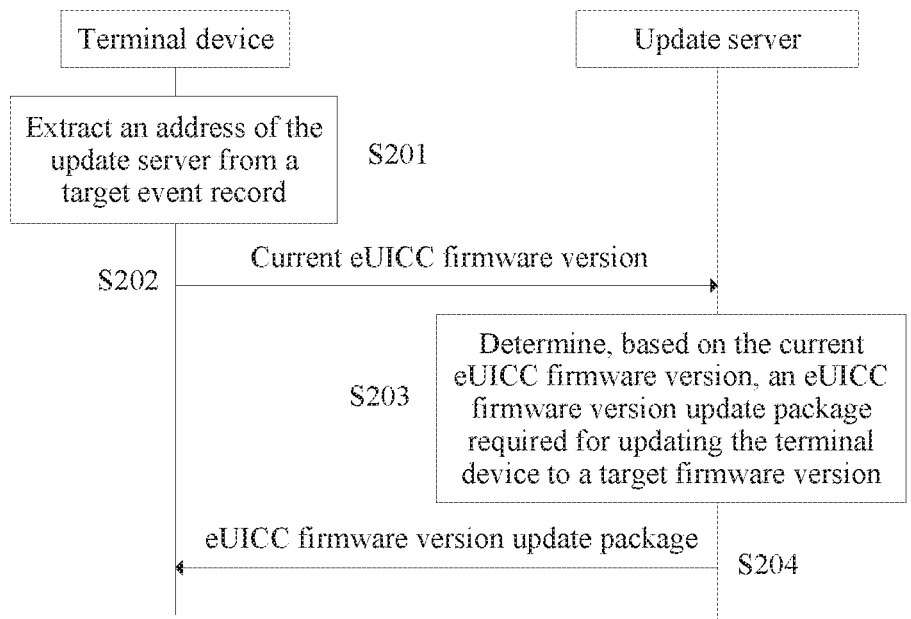
FIG. 3 is a schematic flowchart of a method for downloading an eUICC firmware version update package by a terminal device according to an embodiment of this application.

Specifically, a procedure of downloading the eUICC firmware version update package by the terminal device may be shown in FIG. 3. FIG. 3 is a schematic flowchart of a method for downloading an eUICC firmware version update package by a terminal device according to an embodiment of this application. As shown in the figure, the method includes at least the following steps.

S201. The terminal device extracts the address of the update server from the target event record.

Specifically, the update server may be the OPS, or may be another server that provides an eUICC firmware update package download service for the terminal device. For example, the update server may also be an SM-DP+ or the like.

S202. The terminal device sends a current eUICC firmware version to the update server, and the update server receives the current eUICC firmware version.

In an optional implementation, the terminal device may add the current eUICC firmware version to a first command (for example, AuthenticateClient) and send the first command to the update server in a bidirectional authentication process with the update server. Alternatively, the terminal device may add the current eUICC firmware version to a second command (for example, InitiateAuthentication) and send the second command to the update server in a bidirectional authentication process with the update server.

S203. The update server determines, based on the current eUICC firmware version, the eUICC firmware version update package required for updating the terminal device to the target firmware version.

Specifically, the eUICC firmware version update package may be an eUICC firmware version update incremental package, an eUICC firmware version update full package, or an eUICC firmware version bug fix package. The firmware version update incremental package includes a module part in the eUICC firmware version. The firmware version update incremental package may also be in a form of a differential package, to be specific, the firmware version update incremental package includes only a different part between a new firmware version and an old firmware version. Therefore, the eUICC firmware version update incremental package may be used to complete an update operation in a manner of patching the eUICC firmware version. The eUICC firmware version update full package includes a completed firmware version installation package, and an eUICC needs to enter a recovery mode in advance, so that the eUICC firmware version update full package can be installed. The eUICC firmware version bug fix package may be an update package generated to resolve a bug fix problem of an eUICC platform, an eUICC system, or an eUICC platform and an eUICC system.

S204. The update server sends the eUICC firmware version update package to the terminal device, and the terminal device receives the eUICC firmware version update package.

S105. The terminal device updates a firmware version of an eUICC based on the eUICC firmware version update package.

To facilitate clearer description of the technical solutions in the embodiments of this application, the following describes, by using the LPA and the eUICC of the terminal device as independent execution bodies, a specific implementation process of a method for updating an eUICC firmware version by the terminal device. It should be understood that after an interaction step (to be specific, an internal interaction process of the terminal device) between the LPA and the eUICC is omitted, operation steps performed by the LPA and the eUICC are operation steps performed by the terminal device. The following describes the foregoing embodiment in detail by using an SM-DS as the event management server and an OPS as the update server.

Figure 4A:
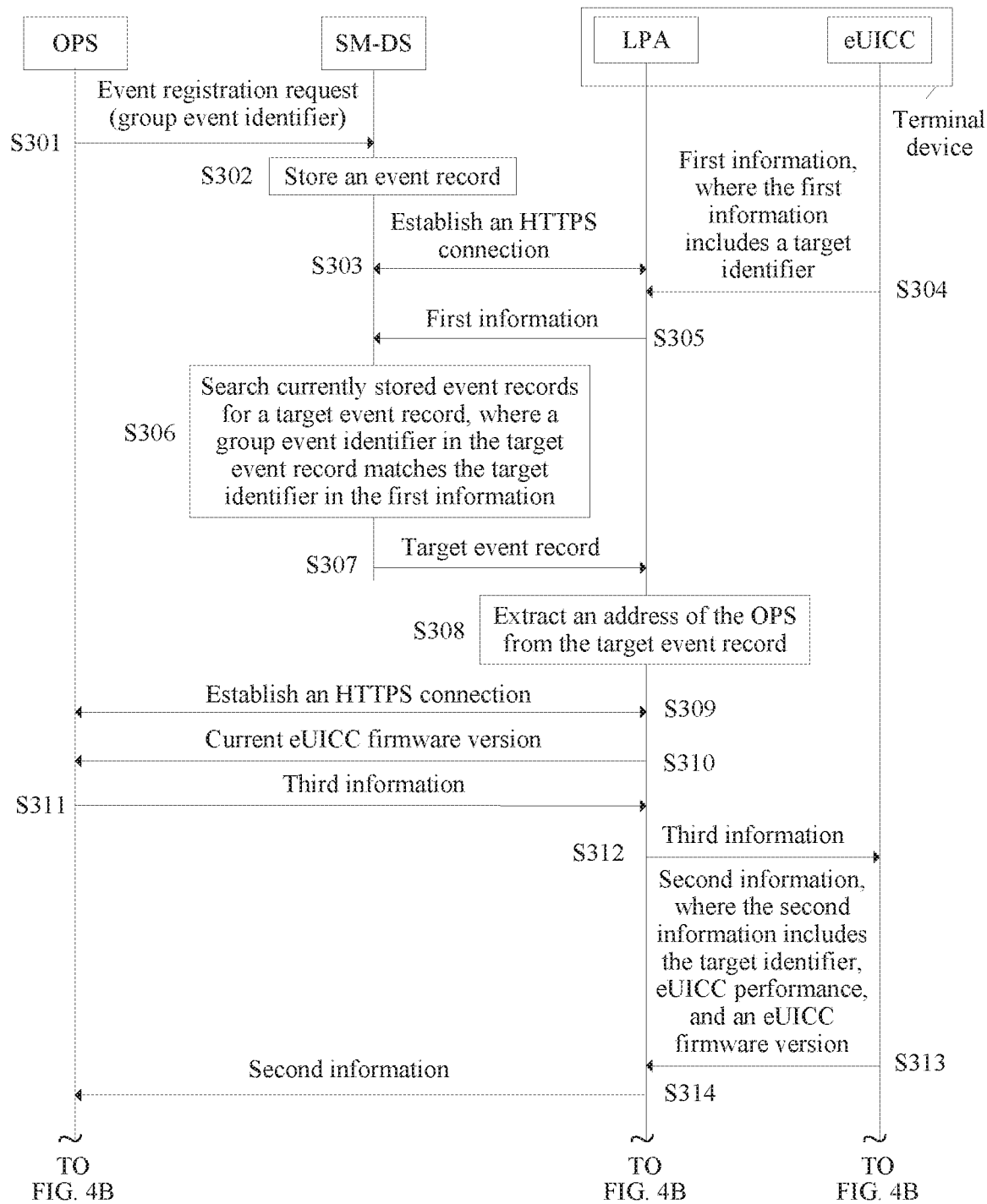
FIG. 4A and FIG. 4B are a schematic flowchart of another method for updating a firmware version according to an embodiment of this application.
Figure 4B:
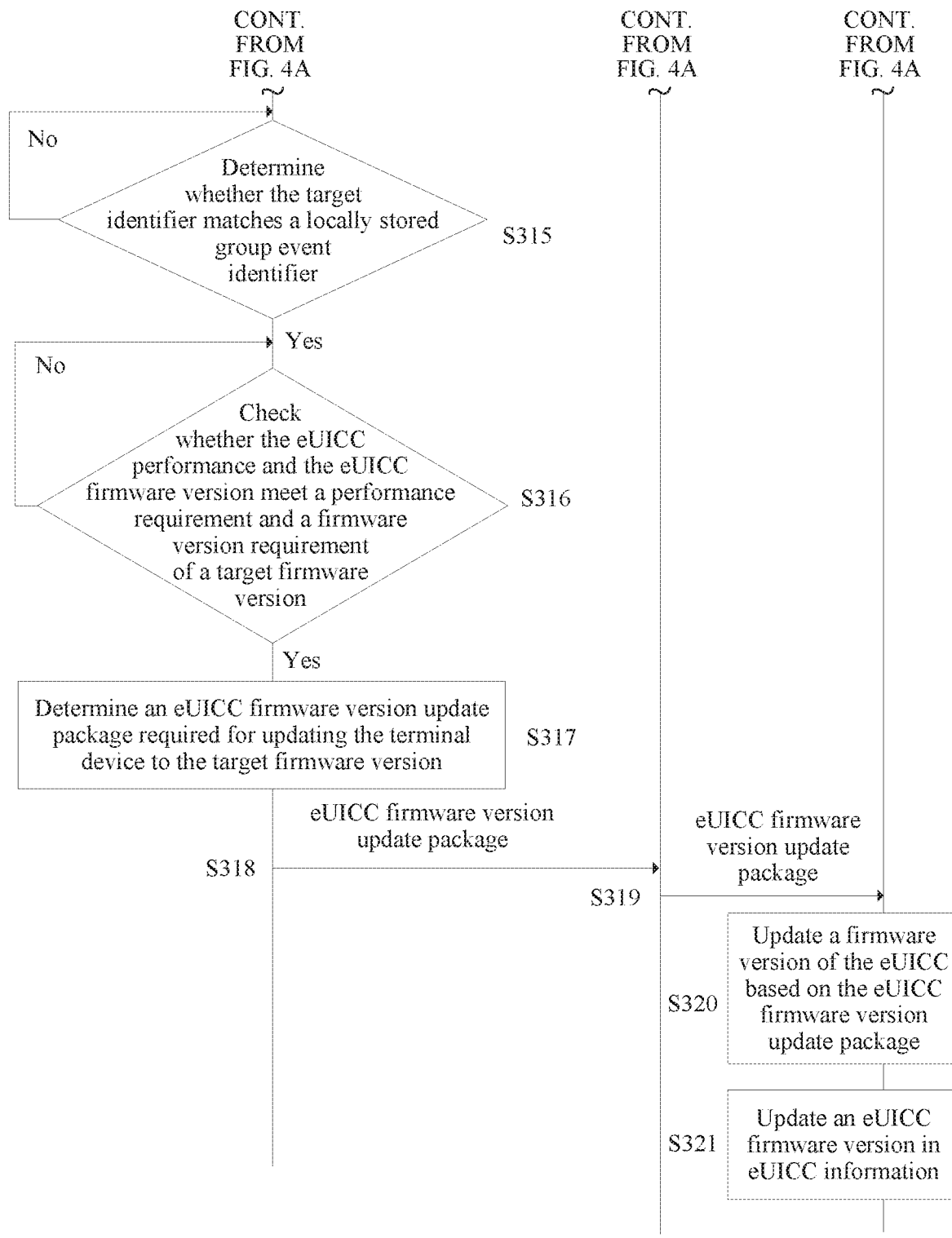

FIG. 4A and FIG. 4B are a schematic flowchart of another method for updating an eUICC firmware version according to an embodiment of this application. As shown in the figure, the method includes the following steps.

S301. The OPS sends an event registration request (for example, RegisterEvent) to the SM-DS, where the event registration request carries a group event identifier, and the SM-DS receives the event registration request, where the group event identifier includes at least one eUICC firmware version and at least one issuer identifier.

Optionally, before sending the event registration request to the SM-DS, the OPS may further perform bidirectional authentication with the SM-DS.

Optionally, the event registration request may further carry an address of the OPS and an event identity (Event Identity, EventID).

Optionally, the group event identifier may further include a custom identifier or a country code (country code).

Specifically, when the group event identifier is an eUICC firmware version, the event registration request may carry at least one eUICC firmware version. It indicates that the OPS may currently provide an eUICC firmware version update service for an eUICC corresponding to the at least one eUICC firmware version.

For example, the OPS may currently provide the eUICC firmware version update service for eUICCs in a plurality of versions. A target firmware version is 50000, and the OPS may provide the eUICC firmware version update service for an eUICC whose eUICC firmware version is 49999, 49998, or 49997. In this case, the OPS adds 49999, 49998, and 49997 to the event registration request and sends the event registration request to the SM-DS.

Optionally, the custom identifier may include additional issuer information (additional issuer information) or a personal identification number (individual identification number) in a preset custom bit.

Optionally, there may be one or more preset custom bits. For example, the custom identifier may be a character within a digit range of a personal identification number, for example, the custom identifier is a character within a range from 100100110111 to 101110110101. The custom identifier may also be a character that is located at an $n^{th}$ bit of the personal identification number (a value of n is 1 to 12), or the custom identifier may also be characters that are located at odd bits of the personal identification number, to be specific, characters that are located at the first bit, the third bit, the fifth bit, the seventh bit, the ninth bit, and the eleventh bit of the personal identification number. The custom identifier may also be characters that are located at even bits of the personal identification number, to be specific, a second bit, a fourth bit, a sixth bit, an eighth bit, a tenth bit, and a twelfth bit of the personal identification number. The custom identifier may further be characters that are located at the first bit to the fifth bit of the personal identification number. The custom identifier may further be characters that are located at the third bit to the eighth bit of the personal identification number, or the like. The personal identification number includes 12 bits in total. There may be a plurality of setting rules for the preset custom bit. Correspondingly, different preset custom bits indicate different custom identifiers. Details are not listed herein.

S302. The SM-DS stores an event record.

Specifically, the SM-DS stores, in the event record, the group event identifier in the event registration request.

Optionally, the SM-DS may further store the address of the OPS and the event identity in the event record.

So far, the SM-DS stores the event record that includes the group event identifier and that waits for an LPA to query, where the group event identifier corresponds to at least one eUICC.

S303. The LPA establishes a hypertext transfer protocol secure (HyperText Transfer Protocol Secure, HTTPS) connection to the SM-DS.

Specifically, in a condition such as a user operation, timing triggering, or eUICC triggering, the LPA initiates a connection request to the SM-DS, to query whether there is an event record corresponding to the eUICC.

Optionally, the LPA may obtain a default SM-DS address from the eUICC. For example, a terminal device is customized and manufactured by an operator A, and the operator A specifies that an SM-DS address is preset in an eUICC, or a terminal manufacturer presets an SM-DS address shared by a plurality of operators in an eUICC.

Optionally, the HTTPS may run on a transport layer security (Transport Layer Security, TLS) connection. For example, the LPA performs unidirectional certificate authentication on the SM-DS, and establishes the TLS connection after the authentication succeeds.

S304. An eUICC sends first information to the LPA, and the LPA receives the first information, where the first information includes a target identifier.

Optionally, the first information may be second authentication information sent by the terminal device to the SM-DS in a bidirectional authentication process between the terminal device and the SM-DS.

Optionally, the first information may include eUICC to-be-signed data (for example, euiccSigned1), a signature value (for example, euiccSignature1) of the eUICC to-be-signed data, an eUICC certificate (for example, CERT.EUICC.ECDSA), an eUICC manufacturer certificate (for example, CERT.EUM.ECDSA), and the like.

Specifically, the eUICC to-be-signed data (for example, euiccSigned1) may include eUICC information, where the eUICC information in the eUICC to-be-signed data (for example, euiccSigned1) is additional eUICC information (for example, euiccInfo2). The eUICC certificate (for example, CERT.EUICC.ECDSA) includes an eUICC identity (eUICC Identity, EID).

Specifically, the additional eUICC information (for example, euiccInfo2) includes an eUICC firmware version (euiccFirmwareVersion) and eUICC performance (UICCCapability).

Optionally, the first information may be information sent by the terminal device to the SM-DS after the bidirectional authentication process between the terminal device and the SM-DS ends. For example, the first information may include the additional eUICC information (for example, euiccInfo2), the EID, and the like.

Optionally, the target identifier may include at least one of the following information; the eUICC firmware version, an issuer identifier, a custom identifier, or a country code.

Specifically, the eUICC firmware version in the first information is a current firmware version of the eUICC. For example, if the current firmware version of the eUICC is 49997, the eUICC firmware version in the first information is 49997.

S305. The LPA sends the first information to the SM-DS, and the SM-DS receives the first information.

Optionally, the LPA may add the first information to a first command (for example, AuthenticateClient) and send the first command to the SM-DS.

S306. The SM-DS searches currently stored event records for a target event record, where the group event identifier in the target event record matches the target identifier in the first information.

Specifically, the SM-DS may obtain the target identifier from the first information, obtain the group event identifier from the currently stored event records, and compare the target identifier with the group event identifier. If the target identifier is the same as the group event identifier or the target identifier belongs to the group event identifier, it is determined that the group event identifier in the target event record matches the target identifier in the first information.

Optionally, if the group event identifier is an eUICC firmware version, the SM-DS may obtain the eUICC firmware version from the additional eUICC information (for example, euiccInfo2) in the first information as the target identifier in the first information. The SM-DS may also obtain the EID from the eUICC certificate (for example, CERT.EUICC.ECDSA) in the first information, extract the eUICC firmware version from the EID as the target identifier in the first information, and separately compare the target identifier with a group event identifier in at least one event record, to determine, in the at least one event record, the target event record whose group event identifier matches the target identifier.

Specifically, the SM-DS may extract characters at the ninth bit to the thirteenth bit of the EID, and determine the characters as the eUICC firmware version, to be specific, the target identifier in the first information.

For example, the group event identifier is an eUICC firmware version, and eUICC firmware versions in an event record 1 are 49999, 49998, and 49997. The eUICC firmware version that is obtained by the SM-DS from the first information is 49997, and 49997 belongs to the group event identifier. Therefore, the group event identifier matches the target identifier, and the event record 1 is determined as the target event record.

Optionally, if the group event identifier is an issuer identifier, the SM-DS may obtain the EID from the eUICC certificate (such as CERT.EUICC.ECDSA) in the first information, extract the issuer identifier from the EID as the target identifier in the first information, and separately compare the target identifier with a group event identifier in at least one event record, to determine, in the at least one event record, the target event record whose group event identifier matches the target identifier.

Specifically, the SM-DS may extract characters at the sixth bit to the eighth bit of the EID, and determine the characters as the issuer identifier, to be specific, the target identifier in the first information.

For example, the group event identifier is an issuer identifier, and an issuer identifier in an event record 2 is 1111. If characters extracted by the SM-DS at the fifth bit to the eighth bit of the EID are 1111, it is determined that the group event identifier matches the target identifier, and the event record 2 is determined as the target event record.

Optionally, if the group event identifier is the custom identifier and the custom identifier is the additional issuer information, the SM-DS may obtain the EID from the eUICC certificate (such as CERT.EUICC.ECDSA) in the first information, extract the additional issuer information from the EID as the target identifier in the first information, and separately compare the target identifier with a group event identifier in at least one event record, to determine, in the at least one event record, the target event record whose group event identifier matches the target identifier.

Specifically, the SM-DS may extract characters at the fourteenth bit to the eighteenth bit of the EID, and determine the characters as the additional issuer information, to be specific, the target identifier in the first information.

For example, the group event identifier is the custom identifier and the custom identifier is the additional issuer information, and additional issuer information in an event record 3 is 22222. If characters extracted by the SM-DS at the fourteenth bit to the eighteenth bit of the EID are 22222, it is determined that the group event identifier matches the target identifier, and the event record 3 is determined as the target event record.

Optionally, if the group event identifier is the custom identifier and the custom identifier is the personal identification number in the preset custom bit, the SM-DS may obtain the EID from the eUICC certificate (such as CERT.EUICC.ECDSA) in the first information, extract the personal identification number in the preset custom bit from the EID as the target identifier in the first information, and separately compare the target identifier with a group event identifier in at least one event record, to determine, in the at least one event record, the target event record whose group event identifier matches the target identifier.

Specifically, the SM-DS may extract characters at the nineteenth bit to the thirtieth bit of the EID, extract characters in the preset custom bit from the extracted characters at the nineteenth bit to the thirtieth bit, and determine the characters the target identifier in the first information.

For example, the group event identifier is the custom identifier and the custom identifier is the personal identification number in the preset custom bit, the preset custom bit is the second bit to the fourth bit of the personal identification number, and a personal identification number in the preset custom bit in an event record 4 is 333. If characters extracted by the SM-DS from the twentieth bit to the twenty-second bit of the EID are 333, it is determined that the group event matches the target identifier, and the event record 4 is determined as the target event record.

Optionally, if the group event identifier is an issuer identifier, the SM-DS may obtain the EID from the eUICC certificate (such as CERT.EUICC.ECDSA) in the first information, extract the country code from the EID as the target identifier in the first information, and separately compare the target identifier with a group event identifier in at least one event record, to determine, in the at least one event record, the target event record whose group event identifier matches the target identifier.

Specifically, the SM-DS may extract characters at the third bit to the fifth bit of the EID, and determine the characters as the country code, to be specific, the target identifier in the first information.

Optionally, if the group event identifier is two or three types of information in an eUICC firmware version, an issuer identifier, the custom identifier, or the country code, corresponding information may be obtained according to the foregoing method for separately obtaining the eUICC firmware version, the issuer identifier, or the custom identifier, the corresponding information is used as the target identifier in the first information, and the target identifier is compared with a group event identifier in an event record, to determine the target event record whose event identifier matches the target identifier.

S307. The SM-DS sends the target event record to the LPA, and the LPA receives the target event record.

So far, interaction between the LPA and the SM-DS ends, the LPA obtains the target event record, and the LPA may process the target event to obtain information in the target event record, and then performs a corresponding operation based on the information in the event record, for example, performs operations corresponding to step S308 and a step subsequent to step S308.

Optionally, when there are a plurality of target event records, the LPA may process the target event records in sequence.

S308. The LPA extracts the address of the OPS from the target event record.

S309. The LPA establishes an HTTPS connection to the OPS.

S310. The LPA sends a current eUICC firmware version of the terminal device to the OPS, and the OPS receives the current eUICC firmware version of the terminal device.

Optionally, the LPA may add the current eUICC firmware version of the terminal device to a second command (for example, InitiateAuthentication), and send the second command to the OPS.

Optionally, the second command (for example, InitiateAuthentication) may further carry an eUICC random number (for example, eUICCChallenge1), eUICC information, and the address of the OPS. The eUICC information in the second command is initial eUICC information (for example, euiccInfo1).

S311. The OPS sends third information to the LPA, and the LPA receives the third information.

Optionally, the third information may be first authentication information sent by the OPS to the terminal device in a bidirectional authentication process between the terminal device and the OPS.

Optionally, the third information may include a session identity (TransactionIdentity. TransactionID), authentication verification to-be-signed data (for example, OPSSigned1), a signature value of the authentication verification to-be-signed data (for example, OPSSignature1), a target public key identifier (for example, euiccCiPKIdToBeUsed), an authentication certificate of the update server (for example, CERT.OPSauth.ECDSA).

Optionally, the authentication verification to-be-signed data (for example, OPSSigned1) may include the session identity, the current eUICC firmware version of the terminal device, the eUICC random number (for example, euiccChange1), a random number of the update server (for example, OPSChanllenge), and the address of the OPS.

S312. The LPA sends the third information to the eUICC, and the eUICC receives the third information.

Optionally, the LPA may add the third information to a third command (for example, AuthenticateServer) and send the third command to the eUICC.

S313. The eUICC sends second information to the LPA, and the LPA receives the second information, where the second information includes the target identifier, the eUICC performance, and the eUICC firmware version.

Optionally, the second information may be second authentication information sent by the terminal device to the OPS in the bidirectional authentication process between the terminal device and the OPS.

Optionally, the second information may include the eUICC to-be-signed data (for example, euiccSigned1), the signature value (for example, euiccSignature1) of the eUICC to-be-signed data, the eUICC certificate (for example, CERT.EUICC.ECDSA), the eUICC manufacturer certificate (for example, CERT.EUM.ECDSA), and the like.

Optionally, the second information may be information sent by the terminal device to the OPS after the bidirectional authentication between the terminal device and the OPS ends. For example, the second information may include the additional eUICC information (for example, euiccInfo2) and the EID.

S314. The LPA sends the second information to the OPS, and the OPS receives the second information.

Optionally, the LPA may add the second information to a first command (for example, AuthenticateClient) and send the first command to the OPS.

S315. The OPS determines whether the target identifier matches a locally stored group event identifier.

Optionally, for a specific implementation of determining whether the target identifier matches the group event identifier, refer to descriptions of step S306. Details are not described again.

Specifically, when the target identifier matches the locally stored group event identifier, the OPS performs step S316.

S316. The OPS checks whether the eUICC performance and the eUICC firmware version meet a performance requirement and a firmware version requirement of a target firmware version.

Specifically, the OPS may check whether the eUICC performance can support updating the eUICC to the target firmware version. The OPS may check whether the eUICC firmware version belongs to a firmware version range in which a firmware version can be updated to the target firmware version.

For example, the OPS currently provides an eUICC firmware version update server for eUICCs whose eUICC firmware versions are 49997, 49998, and 49999. If the eUICC firmware version of the eUICC is one of eUICC firmware versions: 49997, 49998, and 49999, the eUICC firmware version meets the eUICC firmware version requirement of the target firmware version.

Optionally, after the OPS checks the performance of the eUICC and determines whether the firmware version of the eUICC can be updated to the target firmware version, the method further includes: generating third data (for example, patch Metadata); generating first to-be-signed data (for example, OPSSigned2); generating a signature value of the first to-be-signed data (for example, OPSSignature2); and sending second data to the LPA.

Optionally, the third data (for example, patch Metadata) may include the target firmware version.

Optionally, the second data may include a session identity, the third data (for example, patch Metadata), the first to-be-signed data (for example, OPSSigned2), the signature value of the first to-be-signed data (for example, OPSSignature2), and the like.

Specifically, the first to-be-signed data (for example, OPSSigned2) may include the session identity, the target firmware version, a confirmation code flag (Confirmation Code Required Flag), a temporary key pair public key (for example, bppEuiccOtpk), and the like.

Optionally, after receiving the second data sent by the OPS, the LPA may add the second data to a to-be-downloaded command (for example. PrepareDownload) and send the to-be-downloaded command to the eUICC.

S317. The OPS determines, based on the current eUICC firmware version of the terminal, an eUICC firmware version update package required for updating the terminal device to the target firmware version.

In an implementation, the OPS may obtain the current eUICC firmware version of the terminal device by using step S310. In another implementation, the OPS may also obtain the current eUICC firmware version of the terminal device from the second information.

In a possible implementation, different eUICC firmware version update packages may be designed for different eUICC firmware versions, where different eUICC firmware version update packages include different quantities of system patches and different quantities of function codes. The OPS may search for an eUICC firmware version update package corresponding to the current eUICC firmware version of the terminal device, and determine the eUICC firmware version update package as the eUICC firmware version update package required for updating the terminal device to the target firmware version.

For example, the target firmware version is 50000, and there are currently three types of eUICC firmware version update packages in the OPS, where the eUICC firmware version update packages are respectively a [49997-50000] update package, a [49998-50000] update package, and a [49999-50000] update package. The [49997-50000] update package is an eUICC firmware version update package prepared for an eUICC firmware version: 49997, the [49998-50000] update package is an eUICC firmware version update package prepared for an eUICC firmware version: 49998, and the [49999-50000] update package is an eUICC firmware version update package prepared for an eUICC firmware version: 49999. If the current eUICC firmware version of the terminal device is 49997, the OPS determines that the eUICC firmware version update package required for updating the terminal device to the target firmware version is the [49997-50000] update package. If the current eUICC firmware version of the terminal device is 49998, the OPS determines that the eUICC firmware version update package required for updating the terminal device to the target firmware version is the [49998-50000] update package. If the current eUICC firmware version of the terminal device is 49999, the OPS determines that the eUICC firmware version update package required for updating the terminal device to the target firmware version is the [49999-50000] update package.

S318. The OPS sends the eUICC firmware version update package to the LPA, and the LPA receives the eUICC firmware version update package.

S319. The LPA sends the eUICC firmware version update package to the eUICC, and the eUICC receives the eUICC firmware version update package.

Optionally, the LPA may add the eUICC firmware version update package to a fourth command (for example, LoadBoundPackage) and send the fourth command to the eUICC.

S320. The eUICC updates the firmware version of the eUICC based on the eUICC firmware version update package.

Specifically, the eUICC updates an eUICC platform based on firmware version update data in the eUICC firmware version update package, or updates an eUICC operating system based on firmware version update data in the eUICC firmware version update package, or simultaneously updates an eUICC platform and an eUICC operating system based on firmware version update data in the eUICC firmware version update package, or updates an RSP version based on firmware version update data in the eUICC firmware version update package, or updates a TS version or a global platform (globalplatform) version based on firmware version update data in the eUICC firmware version update package.

Specifically, the eUICC may upgrade a version of the eUICC platform to a target version, or the eUICC may upgrade a version of the eUICC operating system to a target version, or the eUICC may upgrade both a version of the eUICC platform and a version of the eUICC operating system to target versions, or the eUICC may upgrade the RSP version to a target version.

S321. The eUICC updates the eUICC firmware version in the eUICC information.

Optionally, the eUICC may update the eUICC firmware version in the eUICC information based on first data (for example, StoreMetadata) in the eUICC firmware version update package, where the first data includes the target firmware version.

Optionally, the eUICC may update the eUICC firmware version in the eUICC information based on first data (for example, encrypted data) in the eUICC firmware version update package, where the first data includes the target firmware version.

Optionally, the eUICC may also update the eUICC firmware version in the eUICC information based on the second data. For example, the eUICC may update the eUICC firmware version in the eUICC information based on the third data (for example, patch Metadata) in the second data, or the eUICC may update the eUICC firmware version in the eUICC information based on the first to-be-signed data (for example, OPSSigned2) in the second data. Optionally, the eUICC firmware version in the eUICC information may be updated before the eUICC updates the firmware version.

Specifically, the eUICC may update/replace the firmware version in the eUICC information with the target firmware version.

For example, before the eUICC firmware version is updated, the eUICC firmware version in the eUICC information is 49997, and the target firmware version is 50000. After the firmware version is updated, the eUICC updates the eUICC firmware version in the eUICC information to 50000.

Optionally, after updating the eUICC firmware version in the eUICC information, the eUICC may send a notification message to the LPA. The notification message may be carried by an application protocol data unit (APDU). The notification message may include a firmware version update result of the current eUICC. The firmware version upgrade result may further include the target firmware version. The notification message may include one or more of notification metadata, a session identity, a final result, an SM-DP+ object identifier, and an eUICC signature. The notification metadata may include a sequence number and a receiving address. The final result may carry a final updated firmware version status.

In the method shown in FIG. 4A and FIG. 4B, the group event identifier may be corresponding to a plurality of eUICCs, and is applicable to a scenario in which an eUICC firmware version is updated, where eUICC firmware version update is performed for a plurality of eUICCs. The OPS sends, to the SM-DS, the event registration request that carries the group event identifier, so that the SM-DS completes event registration. One event record may be corresponding to a plurality of eUICCs or terminal devices, to avoid a case in which a plurality of events are registered for an eUICC firmware version update service, thereby improving efficiency.

In an optional solution, when there are two eUICCs in the terminal device and both eUICC firmware versions of the two eUICCs need to be updated, the eUICC firmware versions of the two eUICCs may be updated concurrently. It is assumed that the two eUICCs are respectively a first eUICC, namely, an eUICC 1, and a second eUICC, namely, an eUICC 2. The following separately describes an implementation procedure of updating the eUICC firmware versions of the two eUICCs concurrently when the eUICC 1 and the eUICC 1 belong to a same manufacturer and an implementation procedure of updating the eUICC firmware versions of the two eUICCs concurrently when the eUICC 1 and the eUICC 1 belong to different manufacturers.

Figure 5A:
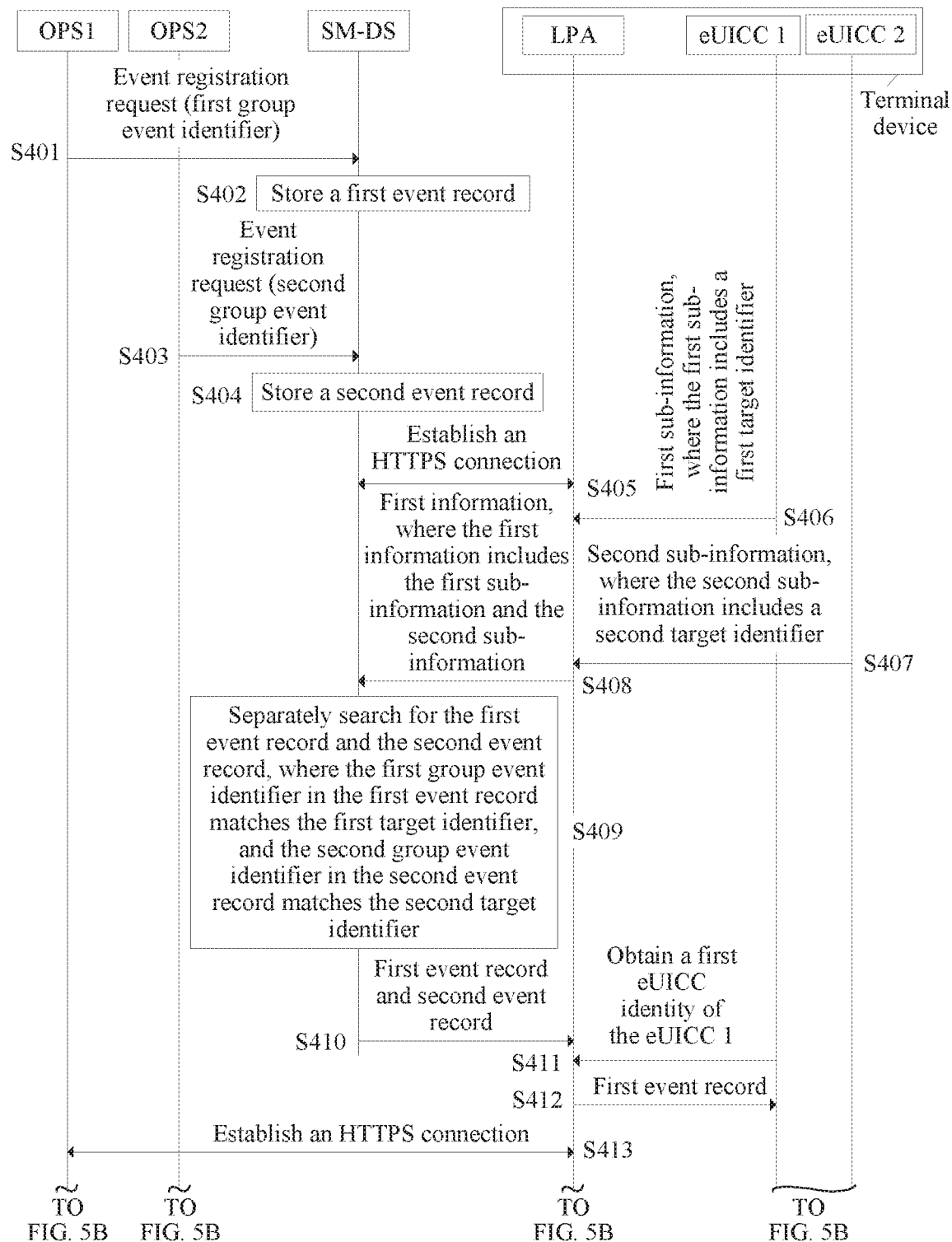
FIG. 5A and FIG. 5B are a schematic flowchart of still another method for updating an eUICC firmware version according to an embodiment of this application.
Figure 5B:
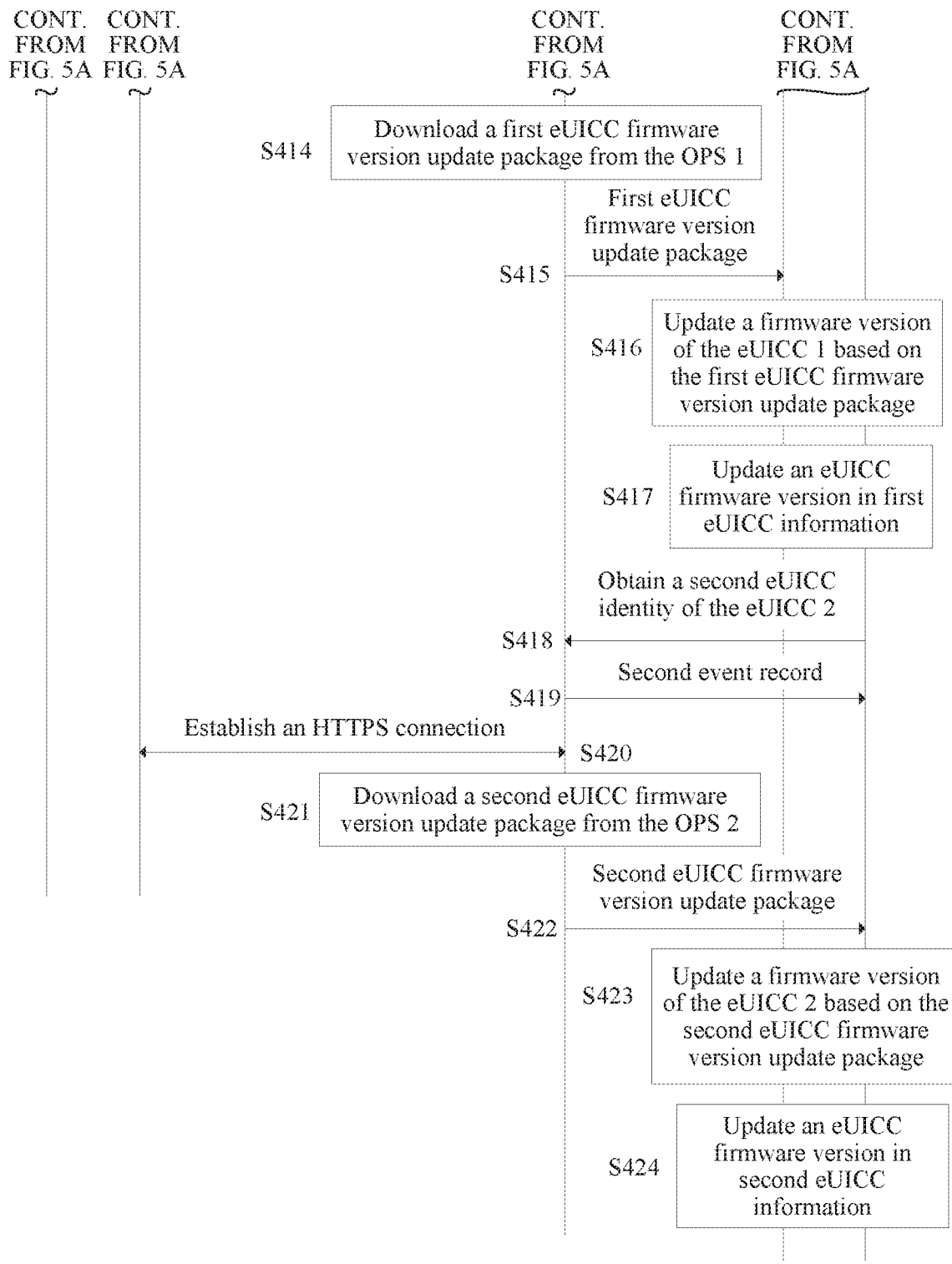

First, a case in which the eUICC 1 and the eUICC 2 belong to different manufacturers is described. It is assumed that an update server corresponding to the eUICC 1 is an OPS 1, and an update server corresponding to the eUICC 2 is an OPS 2. An implementation procedure may be shown in FIG. 5A and FIG. 5B. FIG. 5A and FIG. 5B are a schematic flowchart of still another method for updating an eUICC firmware version according to an embodiment of this application. As shown in the figure, the method includes the following steps.

S401. The OPS 1 sends an event registration request to an SM-DS, where the event registration request carries a first group event identifier, and the SM-DS receives the event registration request, where the first group event identifier includes at least one eUICC firmware version and at least one issuer identifier.

S402. The SM-DS stores a first event record, where the first event record includes the first group event identifier.

S403. The OPS 2 sends an event registration request to the SM-DS, where the event registration request carries a second group event identifier, and the SM-DS receives the event registration request, where the second group event identifier includes at least one eUICC firmware version and at least one issuer identifier.

S404. The SM-DS stores a second event record, where the second event record includes the second group event identifier.

Specifically, for specific implementations of steps S401 and S402 and steps S403 and S404, refer to descriptions of steps S301 and S302 in the embodiment corresponding to FIG. 3. Details are not described again. It should be understood that a type/composition/definition/structure of the first group event identifier in step S401 and a type/composition/definition/structure of the second group event identifier in step S403 may be the same as that of the group event identifier in step S301. The group event identifier in step S301 may include the first group event identifier and/or the second group event identifier. A type/composition/definition/structure of the first event record in step S402 and a type/composition/definition/structure of the second event record in step S404 may be the same as that of the target event record in step S302. The target event record in step S302 may include the first event record and/or the second event record.

It should be noted that steps S401 and S402 and steps S403 and S404 may be mutually independent and concurrent steps. In an optional embodiment, steps S401 and S402 and steps S403 and S404 may be performed simultaneously, or steps S401 and S402 may be performed after steps S403 and S404 are performed.

So far, the SM-DS stores the first event record corresponding to the eUICC 1 and the second event record corresponding to the eUICC 2, and where the first event record and the second event record wait for an LPA to query.

S405. The LPA establishes an HTTPS connection to the SM-DS.

Specifically, for a specific implementation of step S405, refer to descriptions of step S303. Details are not described herein again.

S406. The eUICC 1 sends first sub-information to the LPA, and the LPA receives the first sub-information, where the first sub-information includes a first target identifier.

Optionally, the first sub-information may be first authentication sub-information in second authentication information sent by a terminal device to the SM-DS in a bidirectional authentication process between the terminal device and the SM-DS.

Optionally, the first sub-information may include first eUICC to-be-signed data (for example, euicc1Signed1), a signature value (for example, euicc1Signature1) of the first eUICC to-be-signed data, a first eUICC certificate (for example, CERT.EUICC1.ECDSA), a first eUICC manufacturer certificate (for example, CERT.EUM1.ECDSA), and the like.

The first eUICC to-be-signed data (for example, euicc1Signed1) is eUICC to-be-signed data, and may specifically include first eUICC information. The first eUICC information in the first eUICC to-be-signed data (for example, euicc1Signed1) is first additional eUICC information (for example, euicc1Info2). The first eUICC certificate (for example, CERT.EUICC1.ECDSA) is an eUICC certificate, and may specifically include a first eUICC identity (for example, EID1).

The first target identifier is a target identifier, and may specifically include at least one of the following information: an eUICC firmware version of the eUICC 1, an issuer identifier of the eUICC 1, a custom identifier of the eUICC 1, or a country code of the eUICC 1.

S407. The eUICC 2 sends second sub-information to the LPA, and the LPA receives the second sub-information, where the second sub-information includes a second target identifier.

Optionally, the second sub-information may be second authentication sub-information in the second authentication information sent by the terminal device to the SM-DS in the bidirectional authentication process between the terminal device and the SM-DS.

Optionally, the second sub-information may include second eUICC to-be-signed data (for example, euicc2Signed1), a signature value (for example, euicc2Signature1) of the second eUICC to-be-signed data, a second eUICC certificate (for example, CERT.EUICC2.ECDSA), a second eUICC manufacturer certificate (for example, CERT.EUM2.ECDSA), and the like.

The second eUICC to-be-signed data (for example, euicc2Signed1) is eUICC to-be-signed data, and may specifically include second eUICC information. The second eUICC information in the second eUICC to-be-signed data (for example, euicc2Signed1) is second additional eUICC information (for example, euicc2Info2). The second eUICC certificate (for example, CERT.EUICC2.ECDSA) is an eUICC certificate, and may specifically include a second eUICC identity (for example, EID2).

The second target identifier is a target identifier, and may specifically include at least one of the following information: an eUICC firmware version of the eUICC 2, an issuer identifier of the eUICC 2, a custom identifier of the eUICC 2, or a country code of the eUICC 2.

It should be noted that step S406 and step S407 may be mutually independent and concurrent steps. In an optional embodiment, step S406 and step S407 may be performed simultaneously, or step S406 may be performed after step S407 is performed.

It should be understood that a type/composition/definition/structure of the first sub-information and a type/composition/definition/structure of the second sub-information may be the same as that of the first information in step S304, to be specific, the first information in step S304 may include the first sub-information and/or the second sub-information.

S408. The LPA sends first information to the SM-DS, where the first information includes the first sub-information and the second sub-information, and the SM-DS receives the first information.

S409. The SM-DS separately searches currently stored event records for the first event record and the second event record, where the first group event identifier in the first event record matches the first target identifier, and the second group event identifier in the second event record matches the second target identifier.

Specifically, the SM-DS may obtain the first target identifier and the second target identifier from the first information, obtain the first group event identifier and the second group event identifier from the currently stored event records, match the first target identifier with the first group event identifier, and match the second target identifier with the second group event. If the first target identifier is the same as the first group event identifier or the first target identifier belongs to the first group event identifier, it is determined that the first target identifier matches the first group event identifier. If the second target identifier is the same as the second group event identifier or the second target identifier belongs to the second group event identifier, it is determined that the second target identifier matches the second group event identifier.

Optionally, for a specific implementation in which the SM-DS obtains the first target identifier and the second target identifier, determines that the first target identifier matches the first group event identifier, and determines that the second target identifier matches the second group event identifier, refer to descriptions of step S306. Details are not described again.

S410. The SM-DS sends the first event record and the second event record to the LPA, and the LPA receives the first event record and the second event record.

So far interaction between the LPA and the SM-DS ends, and the LPA obtains the first event record corresponding to the eUICC 1 and the second event record corresponding to the eUICC 2.

Optionally, the LPA may process the first event record and the second event record in sequence.

S411. The LPA obtains the first eUICC identity of the eUICC 1.

In an optional implementation, the LPA may obtain the first eUICC identity of the eUICC 1 by obtaining the certificate of the eUICC 1 in a process of performing bidirectional authentication with the SM-DS. The LPA may also obtain the first eUICC identity of the eUICC 1 by obtaining an EID instruction (for example, GetEID) after the bidirectional authentication process with the SM-DS ends.

S412. The LPA sends the first event record to the eUICC 1 based on the first eUICC identity, and the eUICC 1 receives the first event record.

Optionally, the LPA may obtain the first target identifier from the first eUICC identity, and when the first target identifier matches the first group event identifier in the first event record, the LPA determines to send the first event record to the eUICC 1.

S413. The LPA establishes an HTTPS connection to the OPS 1.

S414. The LPA downloads a first eUICC firmware version update package from the OPS 1.

Specifically, for a specific implementation process in which the LPA downloads the first eUICC firmware version update package from the OPS 1, refer to steps S310 to S318. Details are not described again.

S415. The LPA sends the first eUICC firmware version update package to the eUICC 1, and the eUICC 1 receives the first eUICC firmware version update package.

S416. The eUICC 1 updates the firmware version of the eUICC 1 based on the first eUICC firmware version update package.

S417. The eUICC 1 updates an eUICC firmware version in the first eUICC information.

Specifically, for a specific implementation of steps S415 to S417, refer to descriptions of steps S319 to S321. Details are not described again.

S418. The LPA obtains the second eUICC identity of the eUICC 2.

In an optional implementation, the LPA may obtain the second eUICC identity of the eUICC 2 by obtaining the certificate of the eUICC 2 in the process of performing bidirectional authentication with the SM-DS. The LPA may also obtain the second eUICC identity of the eUICC 2 by obtaining an EID instruction (for example, GetEID) after the bidirectional authentication process with the SM-DS ends.

S419. The LPA sends the second event record to the eUICC 2 based on the second eUICC identity, and the eUICC 2 receives the second event record.

Optionally, the LPA may obtain the second target identifier from the second eUICC identity, and when the second target identifier matches the second group event identifier in the second event record, the LPA determines to send the second event record to the eUICC 1.

S420. The LPA establishes an HTTPS connection to the OPS 2.

S421. The LPA downloads a second eUICC firmware version update package from the OPS 2.

Specifically, for a specific implementation process in which the LPA downloads the second eUICC firmware version update package from the OPS 2, refer to steps S310 to S318. Details are not described again.

S422. The LPA sends the second eUICC firmware version update package to the eUICC 2, and the eUICC 2 receives the second eUICC firmware version update package.

S423. The eUICC 2 updates the firmware version of the eUICC 2 based on the second eUICC firmware version update package.

S424. The eUICC 2 updates eUICC firmware version information in the second eUICC information.

Specifically, for a specific implementation of steps S422 to S424, refer to steps S319 to S321. Details are not described again.

It should be noted that steps S411 to S417 and steps S418 to S424 may be mutually independent and concurrent steps. In an optional embodiment, steps S411 to S417 and steps S418 to S424 may be performed simultaneously, or steps S411 to S417 may be performed after steps S418 to S424 are performed.

It should be understood that definitions of the first eUICC firmware version update package and the second eUICC firmware version update package may be the same as a definition of the eUICC firmware version update package in step S318, to be specific, the eUICC firmware version update package in step S318 may include the first eUICC firmware version update package and/or the second eUICC firmware version update package.

In the method described in FIG. 5A and FIG. 5B, the eUICC 1 and the eUICC 2 belong to different manufacturers. When both the eUICC firmware version of the eUICC 1 and the eUICC firmware version of the eUICC 2 need to be updated, the eUICC firmware version of the eUICC 1 and the eUICC firmware version of the eUICC 2 may be updated concurrently. The LPA may send different event records and eUICC firmware version update packages to the corresponding eUICCs based on the EID of the eUICC 1 and the EID of the eUICC 2, thereby improving eUICC firmware version update efficiency.

Figure 6A:
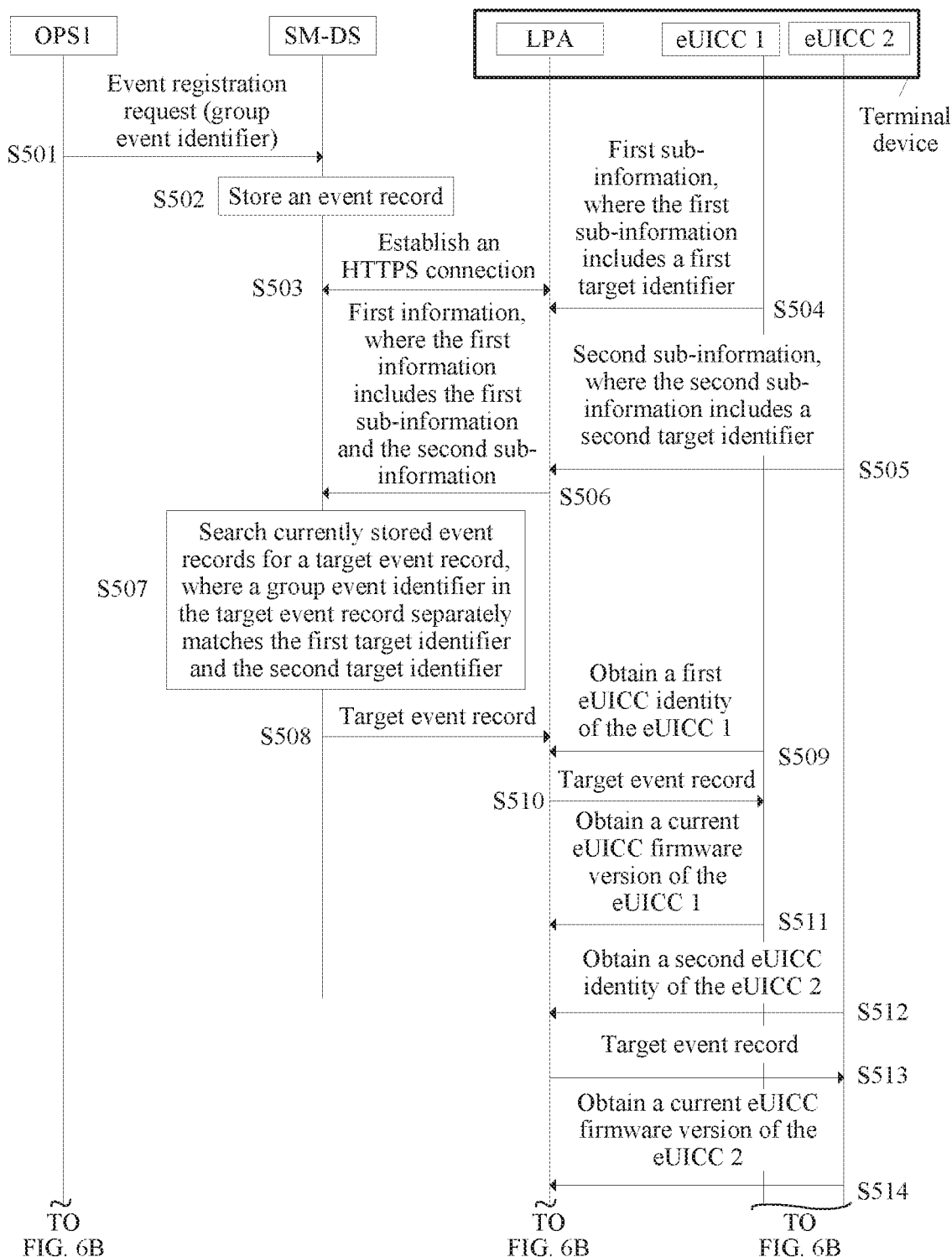
FIG. 6A.
Figure 6B:
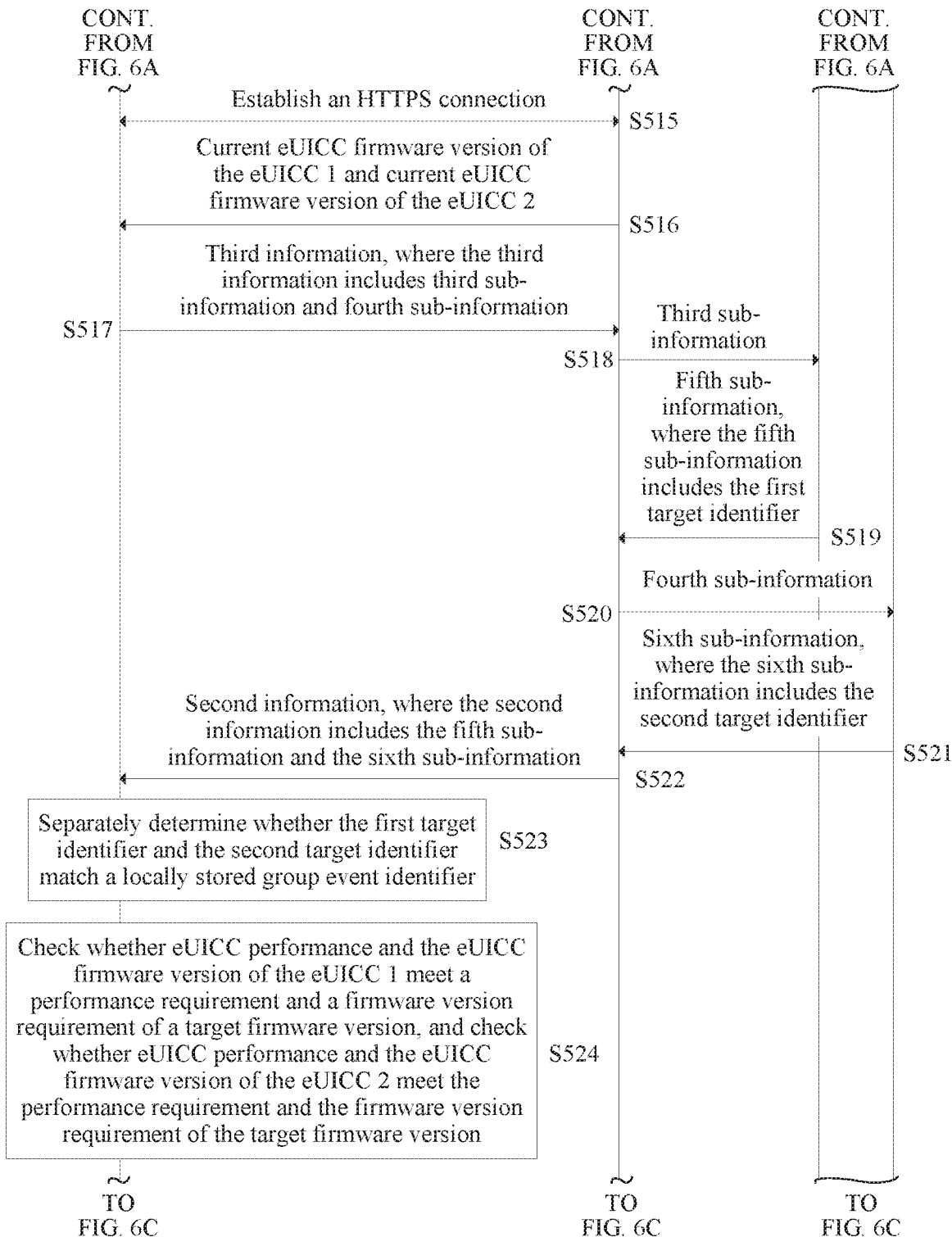
FIG. 6B, and FIG. 6C are a schematic flowchart of still another method for updating an eUICC firmware version according to an embodiment of this application.
Figure 6C:
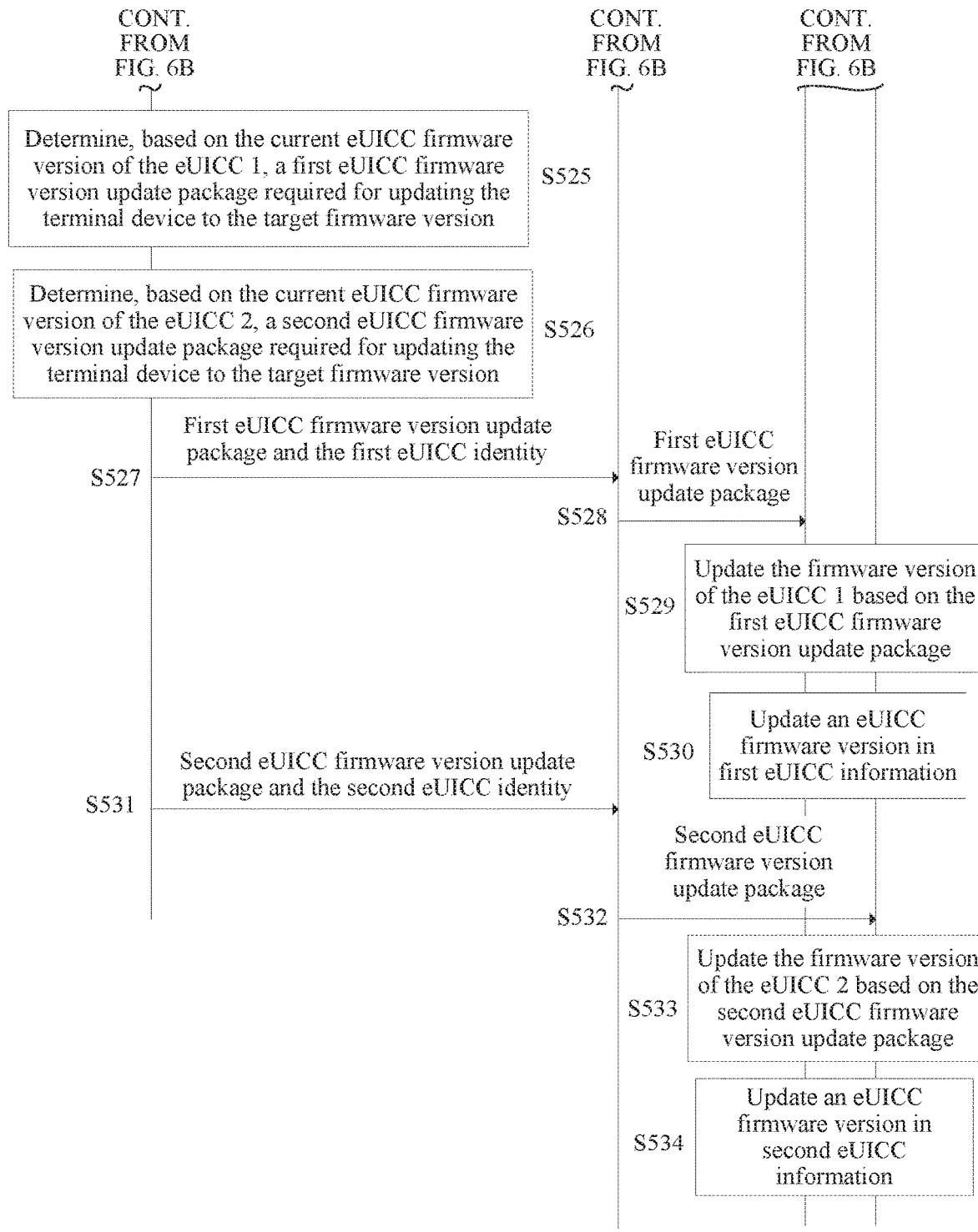

The following describes a case in which the eUICC 1 and the eUICC 2 belong to a same manufacturer. It is assumed that the eUICC 1 and the eUICC 2 correspond to a same update server: OPS. An implementation procedure may be shown in FIG. 6A, FIG. 6B, and FIG. 6C. FIG. 6A, FIG. 6B, and FIG. 6C are a schematic flowchart of still another method for updating an eUICC firmware version according to an embodiment of this application. As shown in the figure, the method includes the following steps.

S501. The OPS sends an event registration request to an SM-DS, where the event registration request carries a group event identifier, and the SM-DS receives the event registration request, where the group event identifier includes at least one eUICC firmware version and at least one issuer identifier.

S502. The SM-DS stores an event record, where the event record includes the group event identifier.

S503. An LPA establishes an HTTPS connection to the SM-DS.

Specifically, for a specific implementation of steps S501 to S503, refer to descriptions of steps S301 to S303. Details are not described again.

S504. The eUICC 1 sends first sub-information to the LPA, and the LPA receives the first sub-information, where the first sub-information includes a first target identifier.

S505. The eUICC 2 sends second sub-information to the LPA, and the LPA receives the second sub-information, where the second sub-information includes a second target identifier.

S506. The LPA sends first information to the SM-DS, where the first information includes the first sub-information and the second sub-information, and the SM-DS receives the first information.

Specifically, for a specific implementation of steps S504 to S506, refer to descriptions of steps S406 to S408. Details are not described again.

S507. The SM-DS searches currently stored event records for a target event record, where a group event identifier in the target event record separately matches the first target identifier and the second target identifier.

In this embodiment of this application, the eUICC 1 and the eUCC 2 belong to the same manufacturer, and the group event identifier in the target event record may simultaneously match the first target identifier and the second target identifier.

Specifically, the SM-DS may obtain the first target identifier and the second target identifier from the first information, obtain the group event identifier from the currently stored event records, and separately match the first target identifier and the second target identifier with the group event identifier. If the first target identifier and the second target identifier are the same as the group event identifier or the first target identifier and the second target identifier belong to the group event identifier, it is determined that the first target identifier and the second target identifier match the group event identifier.

Optionally, for a specific implementation in which the SM-DS obtains the first target identifier and the second target identifier and determines that the first target identifier and the second target identifier separately match the group event, refer to descriptions of step S306. Details are not described again.

S508. The SM-DS sends the target event record to the LPA, and the LPA receives the target event record.

S509. The LPA obtains a first eUICC identity of the eUICC 1.

S510. The LPA sends the target event record to the eUICC 1 based on the first eUICC identity, and the eUICC 1 receives the target event record.

Specifically, for a specific implementation of steps S509 and S510, refer to descriptions of steps S411 and S412. Details are not described again.

S511. The LPA obtains a current eUICC firmware version of the eUICC 1.

Optionally, the LPA may further obtain a first eUICC random number (for example, eUICC1Challenge1) of the eUICC 1 and first eUICC information of the eUICC 1, where the first eUICC information is first initial eUICC information (for example, euicc1Info1).

S512. The LPA obtains a second eUICC identity of the eUICC 2.

S513. The LPA sends the target event record to the eUICC 1 based on the second eUICC identity, and the eUICC 2 receives the target event record.

Specifically, for a specific implementation of steps S512 and S513, refer to descriptions of steps S418 and S419. Details are not described again.

S514. The LPA obtains a current eUICC firmware version of the eUICC 2.

Optionally, the LPA may further obtain a second eUICC random number (for example, eUICC2Challenge1) of the eUICC 2 and second eUICC information of the eUICC 2, where the second eUICC information is second initial eUICC information (for example, euicc2Info1).

S515. The LPA establishes an HTTPS connection to the OPS.

S516. The LPA sends the current eUICC firmware version of the eUICC 1 and the current eUICC firmware version of the eUICC 2 to the OPS, and the OPS receives the current eUICC firmware version of the eUICC 1 and the current eUICC firmware version of the eUICC 2.

Optionally, the LPA may add the current eUICC firmware version of the eUICC 1 and the current eUICC firmware version of the eUICC 2 to a second command (for example, InitiateAuthentication), and send the second command to the OPS.

Optionally, the second command (for example, InitiateAuthentication) may further carry the first eUICC random number (for example, eUICC1Challenge1), the first initial eUICC information (for example, euicc1Info1), the second eUICC random number (for example, eUICC2Challenge1), the second initial eUICC information (for example, euicc2Info1), and an address of the OPS.

S517. The OPS sends third information to the LPA, and the LPA receives the third information, where the third information includes third sub-information and fourth sub-information.

Optionally, a type/composition/definition/structure of the third sub-information and a type/composition/definition/structure of the fourth sub-information may be the same as the third information in step S311, to be specific, the third information in step S311 may include the third sub-information and/or the fourth sub-information. The third sub-information includes the current eUICC firmware version of the eUICC 1, and the fourth sub-information includes the current eUICC firmware version of the eUICC 2.

Optionally, the third sub-information may be third authentication sub-information in first authentication information sent by the OPS to a terminal device in a bidirectional authentication process between the terminal device and the OPS. The fourth sub-information may be fourth authentication sub-information in the first authentication information sent by the OPS to the terminal device in the bidirectional authentication process between the terminal device and the OPS.

S518. The LPA sends the third sub-information to the eUICC 1.

S519. The eUICC 1 sends fifth sub-information to the LPA, and the LPA receives the fifth sub-information, where the fifth sub-information includes the first target identifier.

Optionally, the fifth sub-information may be first authentication sub-information in second authentication information sent by the eUICC 1 to the LPA in the bidirectional authentication process between the terminal device and the OPS.

Optionally, the fifth sub-information may include first eUICC to-be-signed data (for example, euicc1Signed1), a signature value (for example, euicc1Signature1) of the first eUICC to-be-signed data, a first eUICC certificate (for example, CERT.EUICC1.ECDSA), a first eUICC manufacturer certificate (for example, CERT.EUM1.ECDSA), and the like.

S520. The LPA sends the fourth sub-information to the eUICC 2.

S521. The eUICC 2 sends sixth sub-information to the LPA, and the LPA receives the sixth sub-information, where the sixth sub-information includes the second target identifier.

Optionally, the sixth sub-information may be second authentication sub-information in second authentication information sent by the eUICC 1 to the LPA in a bidirectional authentication process between the terminal device and the SM-DS.

Optionally, the sixth sub-information may include second eUICC to-be-signed data (for example, euicc2Signed1), a signature value (for example, euicc2Signature1) of the second eUICC to-be-signed data, a second eUICC certificate (for example, CERT.EUICC2.ECDSA), a second eUICC manufacturer certificate (for example, CERT.EUM2.ECDSA), and the like.

For specific implementations of step S518 and step S520, refer to descriptions of step S312. Details are not described again.

It should be noted that steps S518 and S519 and steps S520 and S521 may be mutually independent and concurrent steps. In an optional embodiment, steps S518 and S519 and steps S520 and S521 may be performed simultaneously, or steps S518 and S519 may be performed after steps S520 and S521 are performed.

S522. The LPA sends second information to the OPS, where the second information includes the fifth sub-information and the sixth sub-information, and the OPS receives the second information.

S523. The OPS separately determines whether the first target identifier and the second target identifier match a locally stored group event identifier.

S524. The OPS checks whether eUICC performance and the eUICC firmware version of the eUICC 1 meet a performance requirement and a firmware version requirement of a target firmware version, and checks whether eUICC performance and the eUICC firmware version of the eUICC 2 meet the performance requirement and the firmware version requirement of the target firmware version.

Specifically, for a specific implementation of steps S522 to S524, refer to steps S314 to S316. Details are not described again.

S525. The OPS determines, based on the current eUICC firmware version of the eUICC 1, a first eUICC firmware version update package required for updating the terminal device to the target firmware version.

S526. The OPS determines, based on the current eUICC firmware version of the eUICC 2, a second eUICC firmware version update package required for updating the terminal device to the target firmware version.

Specifically, for specific implementations of step S525 and step S526, refer to descriptions of step S317. Details are not described again.

It should be noted that step S525 and step S526 may be mutually independent and concurrent steps. In an optional embodiment, step S525 and step S526 may be performed simultaneously, or step S525 may be performed after step S526 is performed.

S527. The OPS sends the first eUICC firmware version update package and the first eUICC identity to the LPA, and the LPA receives the first eUICC firmware version update package and the first eUICC identity.

S528. The LPA sends the first eUICC firmware version update package to the eUICC 1 based on the first eUICC identity, and the eUICC 1 receives the first eUICC firmware version update package.

S529. The eUICC 1 updates the eUICC firmware version of the eUICC 1 based on the first eUICC firmware version update package.

S530. The eUICC 1 updates an eUICC firmware version in the first eUICC information.

Specifically, for a specific implementation of steps S528 and S529, refer to descriptions of steps S320 and S321. Details are not described again.

S531. The OPS sends the second eUICC firmware version update package and the second eUICC identity to the LPA, and the LPA receives the second eUICC firmware version update package and the second eUICC identity.

S532. The LPA sends the second eUICC firmware version update package to the eUICC 2 based on the second eUICC identity, and the eUICC 2 receives the second eUICC firmware version update package.

S533. The eUICC 2 updates the eUICC firmware version of the eUICC 2 based on the second eUICC firmware version update package.

S534. The eUICC 2 updates an eUICC firmware version in the second eUICC information.

Specifically, for a specific implementation of steps S533 and S534, refer to descriptions of steps S320 and S321. Details are not described again.

It should be noted that steps S527 to S530 and steps S531 to S34 may be mutually independent and concurrent steps. In an optional embodiment, steps S527 to S530 and steps S531 to S34 may be performed simultaneously, or steps S527 to S530 may be performed after steps S531 to S534 are performed.

In an optional implementation, when there is an execution sequence between steps S527 to S530 and steps S531 to S534, to be specific, if the eUICC firmware version of the eUICC 1 needs to be updated before the eUICC firmware version of the eUICC 2 is updated, or the eUICC firmware version of the eUICC 2 needs to be updated before the eUICC firmware version of the eUICC 1 is updated, a notification message may be set after previous eUICC update ends. The notification message may include a firmware version upgrade result of a current eUICC, to indicate an upgrade result of the current eUICC. The notification message may be sent by the eUICC to the OPS by using the LPA. After receiving the notification message, the OPS may send an eUICC firmware version update packet of a next eUICC to the LPA.

For example, after receiving a notification message (for example, HandleNotification) sent by the eUICC 1 by using the LPA, the OPS may send the second eUICC firmware version update packet and the second eUICC identity to the LPA. Alternatively, after receiving a notification message (for example, HandleNotification) sent by the eUICC 2 by using the LPA, the OPS may send the first eUICC firmware version update packet and the first eUICC identity to the LPA.

In an optional implementation, the notification message may include one or more of notification metadata, a session identity, a final result, an SM-DP+ object identifier, and an eUICC signature. The notification metadata may include a sequence number and a receiving address. The final result may carry a final updated firmware version status.

In the method described in FIG. 6A, FIG. 6B, and FIG. 6C, the eUICC 1 and the eUICC 2 belong to the same manufacturer. When both the eUICC firmware version of the eUICC 1 and the eUICC firmware version of the eUICC 2 need to be updated, the eUICC firmware version of the eUICC 1 and the eUICC firmware version of the eUICC 2 are updated concurrently. The LPA may obtain, from the SM-DS, the target event record corresponding to both the eUICC 1 and the eUICC, and simultaneously complete authentication of the two eUICCs with the OPS. The LPA may send eUICC firmware version update packages to the corresponding eUICCs based on the EID of the eUICC 1 and the EID of the eUICC 2, so as to improve eUICC firmware version update efficiency.

Figure 7:
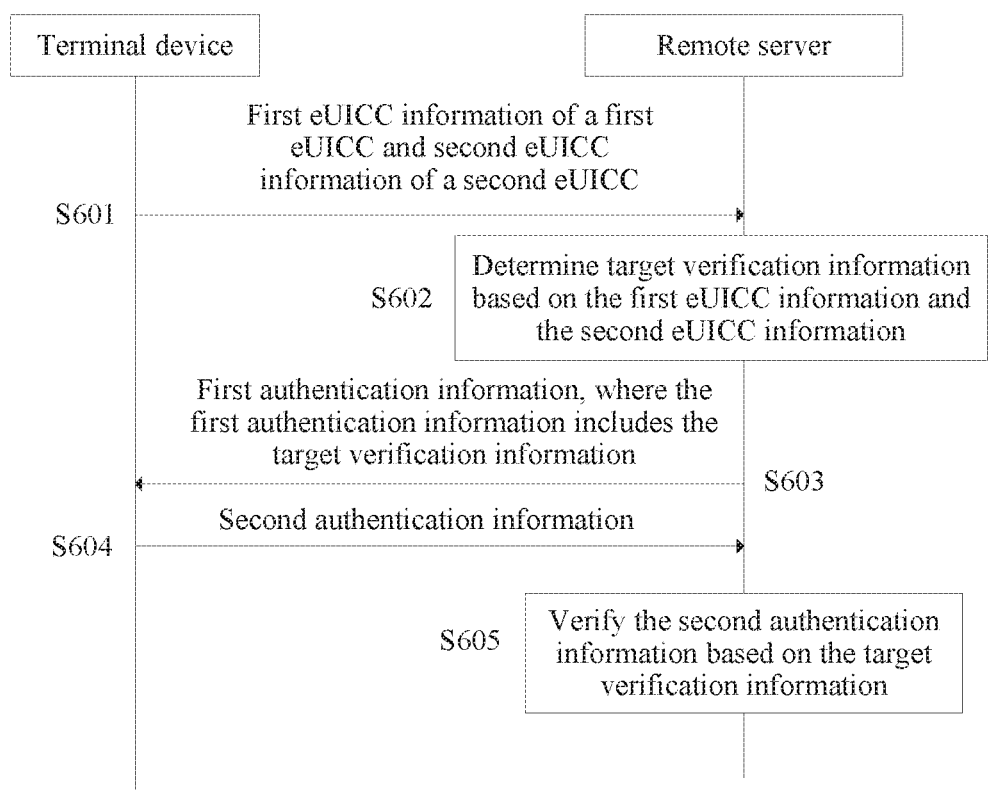
FIG. 7 is a schematic flowchart of a bidirectional authentication method according to an embodiment of this application.

In the foregoing embodiments, when there are two eUICCs in the terminal device, if the two eUICCs need to interact with a same remote server, the terminal device may implement concurrent bidirectional authentication between the remote server and the two eUICCs, and a procedure in which the two eUICCs concurrently perform bidirectional authentication with the remote server may be shown in FIG. 7. FIG. 7 is a schematic flowchart of a bidirectional authentication method according to an embodiment of this application. As shown in the figure, the method includes at least the following steps.

S601. The terminal device sends first eUICC information of a first eUICC and second eUICC information of a second eUICC to the remote server, and the remote server receives the first eUICC information of the first eUICC and the second eUICC information of the second eUICC.

Specifically, the remote server may be a server that can perform bidirectional authentication with the terminal device, such as an OPS, an SM-DS, and an SM-DP.

S602. The remote server determines target verification information based on the first eUICC information and the second eUICC information.

Optionally, the target verification information may include a target public key identifier and a target verification certificate.

Specifically, there may be one or two target public key identifiers, and there may be one or two target verification certificates.

S603. The remote server sends first authentication information to the terminal device, where the first authentication information includes the target verification information, and the terminal device receives the first authentication information.

S604. The terminal device sends second authentication information to the remote server, and the remote server receives the second authentication information.

S605. The remote server verifies the second authentication information based on the target verification information.

Figure 8A:
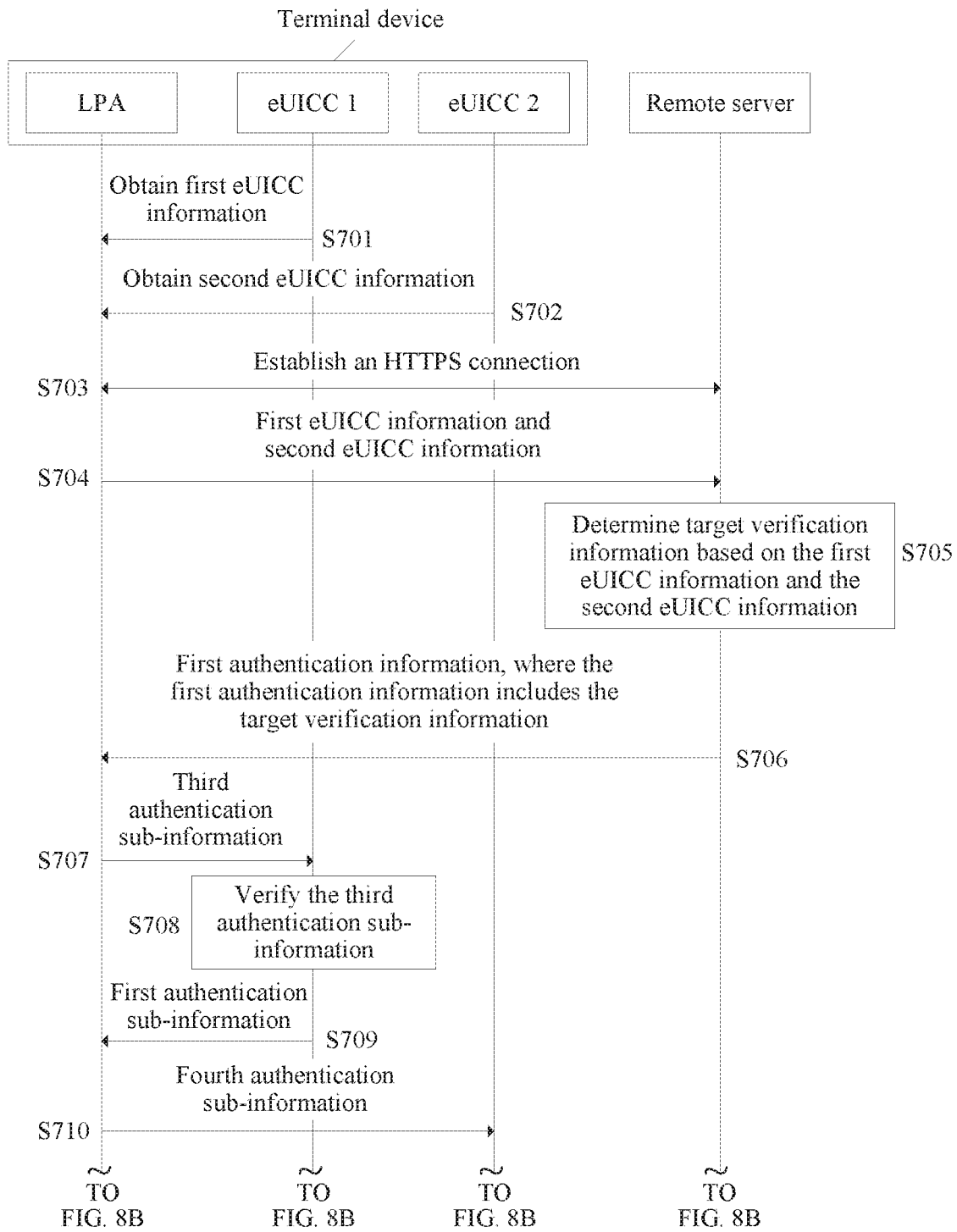
FIG. 8A and FIG. 8B are a schematic flowchart of another bidirectional authentication method according to an embodiment of this application.
Figure 8B:
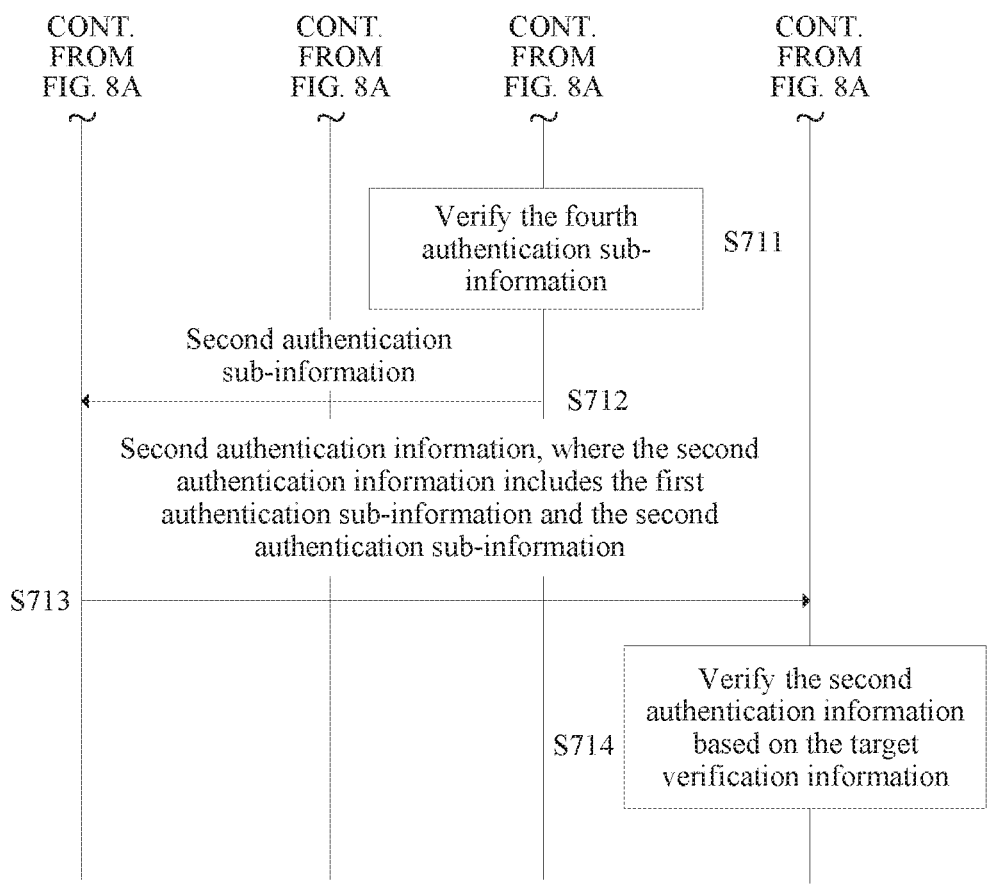

Bidirectional authentication between the terminal device and the remote server is completed through cooperation between an LPA and eUICCs of the terminal device. The following describes a specific implementation process of implementing the bidirectional authentication method by the terminal device by using the LPA and the eUICCs of the terminal device as independent execution bodies. It should be understood that, after interaction steps (to be specific, an internal interaction process of the terminal device) between the LPA and the eUICCs are omitted, operation steps performed by the LPA and the eUICCs are operation steps performed by the terminal device. The eUICCs include a first eUICC, namely, an eUICC 1, and a second eUICC, namely, an eUICC 2. FIG. 8A and FIG. 8B are a schematic flowchart of another bidirectional authentication method according to an embodiment of this application.

S701. The LPA obtains first eUICC information from the eUICC 1.

The first eUICC information is first initial eUICC information (for example, euicc1 Info1).

Specifically, the first initial eUICC information may include a first verification public key identifier list (for example, euiccCiPKIdListForVerification1) and a first signature public key identifier list (for example, euiccCiPKIdListForSigning1).

Optionally, the first verification public key identifier list (for example, euiccCiPKIdListForVerification1) may be the same as or different from the first signature public key identifier list (for example, euiccCiPKIdListForSigning1).

Optionally, the LPA may further obtain a first eUICC random number (for example, eUICC 1Challenge1) from the eUICC 1.

Optionally, before the LPA obtains the first eUICC random number from the eUICC 1, the method further includes: The eUICC 1 generates the first eUICC random number (for example, eUICC 1Challenge1).

S702. The LPA obtains second eUICC information from the eUICC 2.

The second eUICC information is second initial eUICC information (for example, euicc2Info1).

Specifically, the second initial eUICC information may include a second verification public key identifier list (for example, euiccCiPKIdListForVerification2) and a second signature public key identifier list (for example, euiccCiPKIdListForSigning2).

Optionally, the second verification public key identifier list (for example, euiccCiPKIdListForVerification2) may be the same as or different from the second signature public key identifier list (for example, euiccCiPKIdListForSigning2).

Optionally, the LPA may further obtain a second eUICC random number (for example, eUICC2Challenge1) from the eUICC 2.

Optionally, before the LPA obtains the second eUICC random number from the eUICC 2, the method further includes: The eUICC 2 generates the second eUICC random number (for example, eUICC2Challenge1).

It should be noted that step S701 and step S702 may be mutually independent and concurrent steps. In an optional embodiment, step S701 and step S702 may be performed simultaneously, or step S701 may be performed after step S702 is performed.

S703. The LPA establishes an HTTPS connection to the remote server.

S704. The LPA sends the first eUICC information and the second eUICC information to the remote server, and the remote server receives the first eUICC information and the second eUICC information.

Optionally, the LPA may add the first eUICC information and the second eUICC information to a second command (for example, InitiateAuthentication), and send the second command to the remote server.

Optionally, the second command (for example, InitiateAuthentication) may further carry the first eUICC random number (for example, eUICC2Challenge1), the second eUICC random number (for example, eUICC2Challenge1), an address of the remote server, and the like.

S705. The remote server determines target verification information based on the first eUICC information and the second eUICC information.

Optionally, the target verification information may include a target signature public key identifier and a target verification certificate.

Optionally, before the remote server determines the target verification information, the method further includes: The remote server checks the address of the remote server in the second command (for example, InitiateAuthentication), and the remote server checks the first eUICC information and the second eUICC information.

Optionally, the remote server may determine the target signature public key identifier based on the first signature public key identifier list (for example, euiccCiPKIdListForSigning1) in the first eUICC information and the second signature public key identifier list (for example, euiccCiPKldListForSigning2) in the second eUICC information.

Optionally, there may be one or two target signature public key identifiers. When the first signature public key identifier list (for example, euiccCiPKldListForSigning1), the second signature public key identifier list (for example, euiccCiPKIdListForSigning2), and a local certificate issuer (Certificate Issuer, CI) public key identifier list include a same signature public key identifier, the remote server may determine, as the target signature public key identifier (for example, euiccCiPKIdToBeUsed), the signature public key identifier that is in each of the three lists. When the first signature public key identifier list and the second signature public key identifier list do not include a same signature public key identifier, the remote server may select a first signature public key identifier (for example, euiccCiPKId-ToBeUsed1) that is in both the first signature public key identifier list and the local certificate issuer public key identifier list, and a second signature public key identifier (for example, euiccCiPKIdToBeUsed2) that is in both the second signature public key identifier list and the local certificate issuer public key identifier list, and determine the two signature public key identifiers as the target signature public key identifiers. To be specific, the target signature public key identifier may be euiccCiPKIdToBeUsed, or the target signature public key identifiers may be euiccCiPKId-ToBeUsed1 and euiccCiPKIdToBeUsed2.

In an optional implementation, the local CI public key identifier list may further include a local CI public key identifier set.

Specifically, when the first signature public key identifier list (for example, euiccCiPKIdListForSigning1), the second signature public key identifier list (for example, euiccCiPKldListForSigning2), and the local CI public key identifier list include a plurality of same signature public key identifiers, a CI public key identifier corresponding to a CI public key with a highest priority may be selected as the target signature public key identifier (for example, euiccCiPKIdToBeUsed) based on a priority sequence of a plurality of signature public keys corresponding to the plurality of same signature public key identifiers.

Specifically, when the first signature public key identifier list (for example, euiccCiPKldListForSigning1) and the local CI public key identifier list include a plurality of same CI public key identifiers, a CI public key identifier corresponding to a CI public key with a highest priority may be selected as the first signature public key identifier (for example, euiccCiPKIdToBeUsed1) based on a priority sequence of a plurality of CI public keys corresponding to the plurality of same CI public key identifiers.

Specifically, when the second signature public key identifier list (for example, euiccCiPKIdListForSigning2) and the local signature public key identifier list include a plurality of same signature public key identifiers, a signature public key identifier corresponding to a signature public key with a highest priority may be selected as the second signature public key identifier (for example, euiccCiPKId-ToBeUsed2) based on a priority sequence of a plurality of signature public keys corresponding to the plurality of same signature public key identifiers.

Optionally, the remote server may determine the target verification certificate based on the first verification public key identifier list in the first eUICC information and the second verification public key identifier list in the second eUICC information.

Optionally, there may be one or two target verification certificates. When the first verification public key identifier list (for example, euiccCiPKIdListForVerification1), the second verification public key identifier list (for example, euiccCiPKIdListForVerification2), and the local certificate issuer public key identifier list include a same verification public key identifier, the remote server may determine, as the target verification certificate, a certificate (for example, CERT.DSauth.ECDSA) corresponding to a CI public key identifier that is in each of the three lists. When the first verification public key identifier list and the second verification public key identifier list do not include a same CI public key identifier, the remote server may select a first target verification certificate (for example, CERT.DSauth1.ECDSA) corresponding to a first CI public key identifier that is in both the first verification public key identifier list and the local certificate issuer public key identifier list, and a second target verification certificate (for example, CERT.DSauth2.ECDSA) corresponding to a second CI public key identifier that is in both the second verification public key identifier list and the local certificate issuer public key identifier list, and determine the two target verification certificates as the target verification certificates. To be specific, the target certificate may be CERT.DSauth.ECDSA, or the target verification certificates may be CERT.DSauth1.ECDSA and CERT.DSauth2.ECDSA.

Specifically, when the first verification public key identifier list (for example, euiccCiPKldListForVerification1), the second verification public key identifier list (for example, euiccCiPKIdListForVerification2), and the local certificate issuer public key identifier list include a plurality of same CI public key identifiers, a CI public key identifier corresponding to a CI public key with a highest priority may be selected as a target verification public key identifier based on a priority sequence of a plurality of CI public keys corresponding to the plurality of same CI public key identifiers, and a verification certificate corresponding to the target verification public key identifier is determined as the target verification certificate (for example, CERT.DSauth. ECDSA).

Specifically, when the first verification public key identifier list (for example, euiccCiPKIdListForVerification1) and the local CI public key identifier list include a plurality of same CI public key identifiers, a CI public key identifier corresponding to a CI public key with a highest priority may be selected as a first verification public key identifier based on a priority sequence of a plurality of CI public keys corresponding to the plurality of same CI public key identifiers, and a verification certificate corresponding to the first verification public key identifier is determined as the first target verification certificate (for example, CERT.DSauth1.ECDSA).

Specifically, when the second verification public key identifier list (for example, euiccCiPKIdListForVerification2) and the local verification public key identifier list include a plurality of same CI public key identifiers, a CI public key identifier corresponding to a CI public key with a highest priority may be selected as a second verification public key identifier based on a priority sequence of a plurality of CI public keys corresponding to the plurality of same CI public key identifiers, and a verification certificate corresponding to the second verification public key identifier is determined as the second target verification certificate (for example, CERT.DSauth2.ECDSA).

Optionally, after the remote server determines the target verification information, the method further includes: generating a session identity; generating a random number of the remote server (for example, serverChallenge), where the serverChallenge includes but is not limited to OPSChallenge, DSChallenge, and DPChallenge; generating first authentication verification to-be-signed data (for example, serverSigned11), where the serverSigned11 includes but is not limited to DSSigned11, DPSigned11, and OPSSigned11; generating second authentication verification to-be-signed data (for example, serverSigned12), where the serverSigned12 includes but is not limited to DSSigned12, DPSigned12, and OPSSigned12; generating a signature value (for example, serverSignature11) of the first authentication verification to-be-signed data, where the serverSignature11 includes but is not limited to DSSignature11. DPSignature11, and OPSSignature11; and generate a signature value (for example, serverSignature12) of the second authentication verification to-be-signed data, where the serverSignature12 includes but is not limited to DSSignature12. DPSignature12, and OPSSignature12.

Specifically, the remote server signs the first authentication verification to-be-signed data (for example, serverSigned11) by using a private key of the target verification certificate, and generates the signature value (for example, serverSignature11) of the first authentication verification to-be-signed data through calculation. When the first verification public key identifier list, the second verification public key identifier list, and the local certificate issuer public key identifier list include the same CI public key identifier, the target verification certificate is CERT.DSauth.ECDSA. When the first verification public key identifier list and the second verification public key identifier list do not include the same CI public key identifier, the target verification certificate is CERT.DSauth1.ECDSA.

Specifically, the remote server signs the second authentication verification to-be-signed data (for example, serverSigned12) by using the private key of the target verification certificate, and generates the signature value (for example, serverSignature12) of the second authentication verification to-be-signed data through calculation. When the first verification public key identifier list, the second verification public key identifier list, and the local certificate issuer public key identifier list include the same CI public key identifier, the target verification certificate is CERT.DSauth.ECDSA. When the first verification public key identifier list and the second verification public key identifier list do not include the same CI public key identifier, the target verification certificate is CERT.DSauth2.ECDSA.

S706. The remote server sends first authentication information to the LPA, where the first authentication information includes the target verification information, and the LPA receives the first authentication information.

Optionally, the first authentication information may further include a session identity, the first authentication verification to-be-signed data (for example, serverSignature11), the signature value (for example, serverSignature11) of the first authentication verification to-be-signed data, the second authentication verification to-be-signed data (for example, serverSigned12), and the signature value (for example, serverSignature12) of the second authentication verification to-be-signed data.

S707. The LPA obtains third authentication sub-information corresponding to the eUICC 1 from the first authentication information, and sends the third authentication sub-information to the eUICC 1, and the eUICC 1 receives the third authentication sub-information.

Optionally, before the LPA sends the third authentication sub-information to the eUICC 1, the method may further include: The LPA checks the address of the remote server.

Specifically, the third authentication sub-information may include the session identity, the first authentication verification to-be-signed data (for example, serverSigned11), the signature value (for example, serverSignature11) of the first authentication verification to-be-signed data, the target signature public key identifier, and the target verification certificate, where the target signature public key identifier is euiccCiPKIdToBeUsed or euiccCiPKIdToBeUsed1, and the target verification certificate is CERT.DSauth.ECDSA or CERT.DSauth1.ECDSA.

Optionally, the LPA may add the third authentication sub-information to a third command (for example. AuthentiateServer) and send the third command to the eUICC 1.

S708. The eUICC 1 verifies the third authentication sub-information.

Specifically, the eUICC 1 may verify the target verification certificate, verify the signature value (for example, serverSignature11) of the first authentication verification to-be-signed data by using the first authentication verification to-be-signed data (for example, serverSigned11), and verify the first authentication verification to-be-signed data (for example, serverSigned11).

S709. The eUICC 1 sends first authentication sub-information to the LPA, and the LPA receives the first authentication sub-information.

Optionally, before the eUICC 1 sends the first authentication sub-information to the LPA, the method further includes: The eUICC 1 generates first eUICC to-be-signed data (for example, euicc1Signed1), and the eUICC 1 generates a signature value (for example, euicc1Signature) of the first eUICC to-be-signed data.

Optionally, the first authentication sub-information may include the first eUICC to-be-signed data (for example, euicc1Signed1), the signature value (for example, euicc1Signature) of the first eUICC to-be-signed data, a first eUICC certificate (for example, CERT.EUICC1.ECDSA), a first eUICC manufacturer certificate (for example, CERT.EUM1.ECDSA), and the like.

S710. The LPA obtains fourth authentication sub-information corresponding to the eUICC 2 from the first authentication information, and sends the fourth authentication sub-information to the eUICC 2, and the eUICC 2 receives the fourth authentication sub-information.

Specifically, the fourth authentication sub-information may include the session identity, the second authentication verification to-be-signed data (for example, server-Signed12), the signature value (for example, serverSignature12) of the second authentication verification to-be-signed data, the target signature public key identifier, and the target verification certificate, where the target signature public key identifier is euiccCiPKIdToBeUsed or euiccCiP-KIdToBeUsed2, and the target verification certificate is CERT.DSauth.ECDSA or CERT.DSauth2.ECDSA.

Optionally, the LPA may add the fourth authentication sub-information to a fourth command (for example, AuthentiateServer) and send the fourth command to the eUICC 2.

S711. The eUICC 2 verifies the fourth authentication sub-information.

Specifically, the eUICC 1 may verify the target verification certificate, verify the signature value (for example, serverSignature12) of the second authentication verification to-be-signed data by using the second authentication verification to-be-signed data (for example, serverSigned12), and verify the second authentication verification to-be-signed data (for example, serverSigned12).

S712. The eUICC 2 sends second authentication sub-information to the LPA, and the LPA receives the second authentication sub-information.

Optionally, before the eUICC 2 sends the second authentication sub-information to the LPA, the method further includes: The eUICC 2 generates second eUICC to-be-signed data (for example, euicc2Signed1), and the eUICC 2 generates a signature value (for example, euicc2Signature1) of the second eUICC to-be-signed data.

Optionally, the second authentication sub-information may include the second eUICC to-be-signed data (for example, euicc2Signed1), the signature value (for example, euicc2Signature1) of the second eUICC to-be-signed data, a second eUICC certificate (for example, CERT.EUICC2.ECDSA), and a second eUICC manufacturer certificate (for example, CERT.EUM2.ECDSA).

S713. The LPA sends second authentication information to the remote server, where the second authentication information includes the first authentication sub-information and the second authentication sub-information, and the remote server receives the second authentication information.

Optionally, the LPA may add the second authentication information to a first command (for example, Authenticate-Client) and send the first command to the remote server.

S714. The remote server verifies the second authentication information based on the target verification information.

Optionally, the remote server verifies the first eUICC certificate (for example, CERT.EUICC1.ECDSA), verifies the second eUICC certificate (for example, CERT.EUICC2.ECDSA), verifies the first eUICC manufacturer certificate (for example, CERT.EUM1.ECDSA), verifies the second eUICC manufacturer certificate (for example, CERT.EUM2.ECDSA), verifies the signature value (for example, euicc1Signature1) of the first eUICC to-be-signed data by using the first eUICC to-be-signed data (for example, euicc1Signed1), verifies the signature value (for example, euicc2Signature1) of the second eUICC to-be-signed data by using the second eUICC to-be-signed data (for example, euicc2Signed1), verifies the first eUICC to-be-signed data (for example, euicc1Signed1), and verifies the second eUICC to-be-signed data (for example, euicc2Signed1), based on the target verification information.

Optionally, after the second authentication information is verified by the remote server, the remote server and the terminal device may perform another subsequent operation, so that the remote server can continue to provide various services for the terminal device. For example, an SM-DP+ may provide a profile download service and a profile remote management service for the terminal device, an SM-DS may provide an event query service for the terminal device, and an OPS may provide an eUICC firmware version update service for the terminal device.

For example, in an eUICC firmware version update process:

When the remote server is the OPS, the first authentication information may be the third information in step S516 in the embodiment corresponding to FIG. 6A, FIG. 6B, and FIG. 6C, the third authentication sub-information may be the third sub-information in step S516 in the embodiment corresponding to FIG. 6A, FIG. 6B, and FIG. 6C, and the fourth authentication sub-information may be the fourth sub-information in step S516 in the embodiment corresponding to FIG. 6A, FIG. 6B, and FIG. 6C; and the second authentication information may be the second information in step S521 in the embodiment corresponding to FIG. 6A, FIG. 6B, and FIG. 6C, the first authentication sub-information may be the fifth sub-information in step S521 in the embodiment corresponding to FIG. 6A, FIG. 6B, and FIG. 6C, and the second authentication sub-information may be the sixth sub-information in step S521 in the embodiment corresponding to FIG. 6A, FIG. 6B, and FIG. 6C.

When the remote server is the SM-DS, the second authentication information may be the first information in step S408 in the embodiment corresponding to FIG. 5A and FIG. 5B and the first information in step S506 in the embodiment corresponding to FIG. 6A, FIG. 6B, and FIG. 6C, and the first authentication sub-information may be the first sub-information in step S408 in the embodiment corresponding to FIG. 5A and FIG. 5B and the first sub-information in step S506 in the embodiment corresponding to FIG. 6A, FIG. 6B, and FIG. 6C, and the second authentication sub-information may be the second sub-information in step S408 in the embodiment corresponding to FIG. 5A and FIG. 5B and the second sub-information in step S506 in the embodiment corresponding to FIG. 6A, FIG. 6B, and FIG. 6C.

In the method described in FIG. 8A and FIG. 8B, the LPA may implement bidirectional authentication between the remote server and the two eUICCs of the terminal device concurrently by establishing an HTTPS once, so that after the bidirectional authentication is completed, operations on the eUICCs can be separately completed, thereby improving operation efficiency.

The foregoing describes in detail the methods in the embodiments of this application. The following provides apparatuses in the embodiments of this application.

Figure 9:
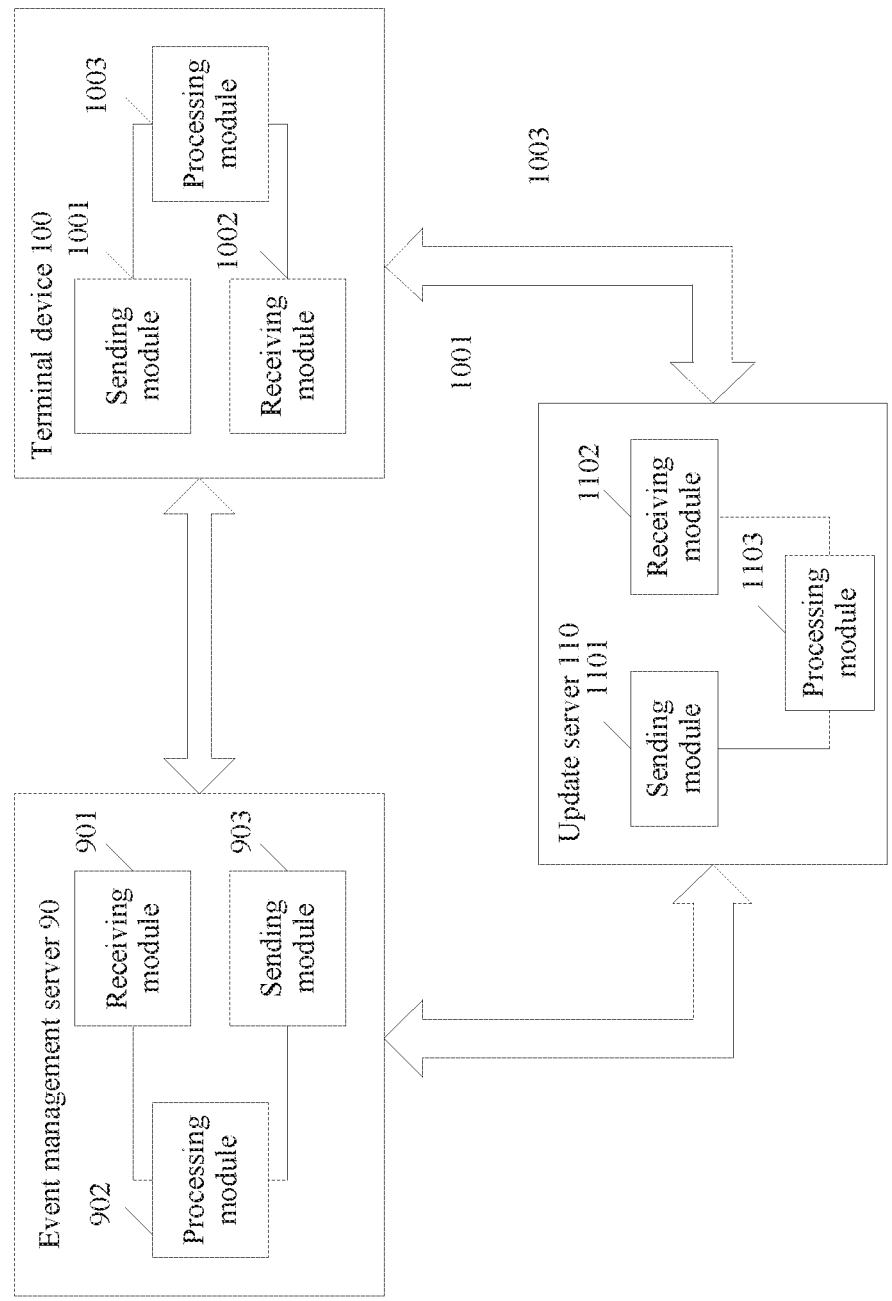
FIG. 9 is a schematic structural diagram of a system including a terminal device, an event management server, and an update server according to an embodiment of this application.

FIG. 9 is a schematic structural diagram of a system including a terminal device, an event management server, and an update server according to an embodiment of this application. As shown in FIG. 9, there is a communication connection such as a Wi-Fi connection or a mobile data connection between an event management server 90, a terminal device 100, and an update server 120, to implement mutual data communication between the event management server 90, the terminal device 100, and the update server 110. Modules of the terminal device, the event management server, and the update server may be implemented by using hardware, software, or a combination of hardware and software, to implement the solutions of this application. A person skilled in the art should understand that the modules described in FIG. 9 may be combined or separated into some sub-blocks to implement the solutions of this application. Therefore, the described content in this application may support any possible combination or separation or further definition of the following modules.

As shown in FIG. 9, the event management server 90 may include:

a receiving module 901, configured to receive first information sent by the terminal device 100, where the first information includes a target identifier;

a processing module 902, configured to search currently stored event records for a target event record, where a group event identifier in the target event record matches the target identifier in the first information, and the group event identifier includes at least one eUICC firmware version and at least one issuer identifier; and a sending module 903, configured to send the target event record to the terminal device 100, where the target event record is used to enable the terminal device 100 to download an eUICC firmware version update package.

Optionally, the receiving module 901 is further configured to:

receive an event registration request sent by the update server 110, where the event registration request carries the group event identifier; and the processing module 902 is further configured to:

store the group event identifier in an event record based on the event registration request.

Optionally, the group event identifier further includes a custom identifier or a country code.

Optionally, the target identifier includes at least one of the following information: an eUICC firmware version, an issuer identifier, a custom identifier, or a country code.

Optionally, the custom identifier includes additional issuer information or a personal identification number in a preset custom bit.

Optionally, the target identifier includes a first target identifier of a first eUICC and a second target identifier of a second eUICC; and the processing module 902 is specifically configured to:

separately search the currently stored event records for a first event record and a second event record, where a group event identifier in the first event record matches the first target identifier, and a group event identifier in the second event record matches the second target identifier; and send the first event record and the second event record to the terminal device 100, where the first event record is used to enable the terminal device 100 to download a first eUICC firmware version update package of the first eUICC, and the second event record is used to enable the terminal device 100 to download a second eUICC firmware version update package of the second eUICC.

As shown in FIG. 9, the terminal device 100 may include:

a sending module 1001, configured to send first information to the event management server 90, where the first information includes a target identifier;

a receiving module 1002, configured to receive a target event record that is obtained by the event management server 90 through querying and that is sent by the event management server 90, where a group event identifier in the target event record matches the target identifier in the first information, and the group event identifier includes at least one eUICC firmware version and at least one issuer identifier; and a processing module 1003, configured to download an eUICC firmware version update package based on the target event record, where the processing module 1003 is further configured to update a firmware version of an eUICC based on the eUICC firmware version update package.

Optionally, the group event identifier further includes a custom identifier or a country code.

Optionally, the target identifier includes at least one of the following information: an eUICC firmware version, an issuer identifier, a custom identifier, or a country code.

Optionally, the custom identifier includes additional issuer information or a personal identification number in a preset custom bit.

Optionally, the target identifier includes a first target identifier of a first eUICC and a second target identifier of a second eUICC;

the receiving module 1002 is specifically configured to:

receive a first event record and a second event record that are obtained by the event management server 90 through querying and that are sent by the event management server 90, where a group event identifier in the first event record matches the first target identifier, and a group event identifier in the second event record matches the second target identifier; and the processing module 1003 is specifically configured to:

download a first eUICC firmware version update package of the first eUICC based on the first event record;

download a second eUICC firmware version update package of the second eUICC based on the second event record;

update a firmware version of the first eUICC based on the first eUICC firmware version update package; and update a firmware version of the second eUICC based on the second eUICC firmware version update package.

Optionally, the processing module 1003 is specifically configured to:

extract an address of the update server 110 from the target event record;

the sending module 1001 is further configured to:

send a current eUICC firmware version to the update server 110; and the receiving module 1002 is further configured to:

receive the eUICC firmware version update package that is sent by the update server 110 based on the current eUICC firmware version.

Optionally, the sending module 1001 is further configured to:

send second information to the update server 110, where the second information includes the target identifier; and the receiving module 1002 is specifically configured to:

receive the eUICC firmware version update package that is sent by the update server 110 based on the current eUICC firmware version when the target identifier in the second information matches a group event identifier stored in the update server 110.

Optionally, the processing module 1003 is specifically configured to:

update an eUICC firmware version in eUICC information based on first data in the eUICC firmware version update package, where the first data includes a target firmware version.

Optionally, the receiving module 1002 is further configured to:

receive second data sent by the update server 110, where the second data includes a target firmware version; and the processing module 1003 is further configured to:

update an eUICC firmware version in eUICC information based on the second data.

As shown in FIG. 9, the update server 110 may include:

a sending module 1101, configured to send an event registration request to the event management server 90, where the event registration request carries a group event identifier, the group event identifier includes at least one eUICC firmware version and at least one issuer identifier, and the event registration request is used to enable the event management server 90 to: store the group event identifier in an event record, and send the event record to the terminal device 100 when receiving first information that is sent by the terminal device and that matches the group event identifier.

Optionally, the update server 110 further includes:

a receiving module 1102, configured to receive a current eUICC firmware version, of the terminal device, that is sent by the terminal device 100; and a processing module 1103, configured to determine, based on the current eUICC firmware version, an eUICC firmware version update package required for updating an eUICC of the terminal device 100 to a target firmware version, where the sending module 1101 is further configured to send the eUICC firmware version update package to the terminal device 100, where the eUICC firmware version update package is used by the terminal device 100 to update a firmware version of the eUICC of the terminal device.

Optionally, the receiving module 1102 is further configured to:

receive second information sent by the terminal device 100, where the second information includes eUICC performance and an eUICC firmware version; and the processing module 1103 is specifically configured to:

when determining that the eUICC performance and the eUICC firmware version meet a performance requirement and a firmware version requirement of the target firmware version, determine, based on the current eUICC firmware version, the eUICC firmware version update package required for updating the eUICC of the terminal device 100 to the target firmware version.

Optionally, the second information further includes a target identifier; and the processing module 1103 is further configured to:

when the target identifier in the second information matches a locally stored group event identifier, determine whether the eUICC performance and the eUICC firmware version can meet the performance requirement and the firmware version requirement of the target firmware version.

It should be noted that for content and specific implementation of each function unit that are not mentioned in the embodiment corresponding to FIG. 9, refer to the embodiment of the method shown in FIG. 2, FIG. 3, FIG. 4A and FIG. 4B, FIG. 5A and FIG. 5B, or FIG. 6A, FIG. 6B, and FIG. 6C. Details are not described herein again.

In the system shown in FIG. 9, the event management server, the terminal device, and the update server cooperate with each other, to complete updating of the firmware version of the eUICC of the terminal device. A plurality of events can be prevented from being registered by matching a group event identifier, and efficiency of event registration and eUICC firmware version update can be improved.

Figure 10:
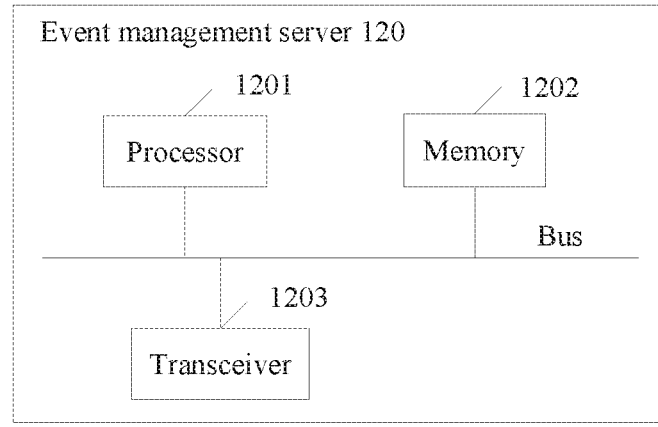
FIG. 10 is a schematic structural diagram of hardware of an event management server according to an embodiment of this application.

In a possible implementation, the processing module 902 may be a processor or a processing chip, the receiving module 901 and the sending module 903 may be a transceiver, and the event management server may further include a memory, configured to store an event record and a computer instruction. The following describes an implementation of the event management server in the embodiment corresponding to FIG. 9. FIG. 10 is a schematic structural diagram of hardware of an event management server according to an embodiment of this application. The event management server 120 includes a processor 1201, a memory 1202, and a transceiver 1203. The processor 1201, the memory 1202, and the transceiver 1203 are connected by using one or more communications buses.

The processor 1201 is configured to support the event management server in performing a corresponding function in the method for updating an eUICC firmware version in FIG. 2, FIG. 4A and FIG. 4B, FIG. 5A and FIG. 5B, or FIG. 6A, FIG. 6B, and FIG. 6C. The processor 1201 may be a central processing unit (central processing unit, CPU), a network processor (network processor, NP), a hardware chip, or any combination thereof. The hardware chip may be an application-specific integrated circuit (application-specific integrated circuit, ASIC), a programmable logic device (programmable logic device, PLD), or a combination thereof. The PLD may be a complex programmable logic device (complex programmable logic device. CPLD), a field-programmable gate array (field-programmable gate array, FPGA), generic array logic (generic array logic, GAL), or any combination thereof.

The memory 1202 is configured to store program code or the like. The memory 1202 may include a volatile memory (volatile memory) such as a random access memory (random access memory, RAM), or the memory 1202 may include a non-volatile memory (non-volatile memory) such as a read-only memory (read-only memory, ROM), a flash memory (flash memory), a hard disk drive (hard disk drive, HDD), or a solid-state drive (solid-state drive, SSD), or the memory 1202 may include a combination of the foregoing types of memories.

The transceiver 1203 is configured to receive and send data.

The processor 1201 may invoke the program code to perform the following operations:

receiving, by using the transceiver 1203, first information sent by a terminal device, where the first information includes a target identifier;

searching currently stored event records for a target event record, where a group event identifier in the target event record matches an event identifier in the first information, and the group event identifier includes at least one eUICC firmware version and at least one issuer identifier; and sending the target event record to the terminal device by using the transceiver 1203, where the target event record is used to enable the terminal device to download an eUICC firmware version update package.

It should be noted that the processor 1201 may further execute operations executed by the event management server in the method shown in FIG. 2, FIG. 4A and FIG. 4B, FIG. 5A and FIG. 5B, or FIG. 6A, FIG. 6B, and FIG. 6C.

An embodiment of this application further provides a computer storage medium. The computer storage medium stores a computer program. The computer program includes a program instruction. When the program instruction is executed by a computer, the computer is enabled to perform the method in the embodiment corresponding to FIG. 2, FIG. 4A and FIG. 4B, FIG. 5A and FIG. 5B, or FIG. 6A, FIG. 6B, and FIG. 6C. The computer may be a part of the event management server mentioned above.

An embodiment of this application further provides a computer program, including a program instruction. When the program instruction is executed by a computer, the computer is enabled to perform the method in the embodiment corresponding to FIG. 2, FIG. 4A and FIG. 4B. FIG. 5A and FIG. 5B, or FIG. 6A, FIG. 6B, and FIG. 6C. The computer program may be some of programs stored in the memory 1202 mentioned above.

Figure 11:
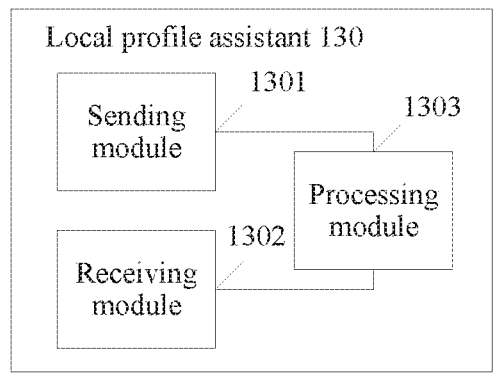
FIG. 11 is a schematic structural diagram of a local profile assistant according to an embodiment of this application.

In a possible implementation, the terminal device may include at least one eUICC and a local profile assistant LPA. The local profile assistant LPA may be deployed on a hardware module of the terminal device as one or more software modules, for example, on a baseband chip, an application processor, or other hardware, or the local file assistant may be directly deployed on an eUICC. The local profile assistant LPA has a function of implementing interaction between an eUICC and the terminal device and interaction between the eUICC and a server outside the terminal device. FIG. 11 is a schematic structural diagram of a local profile assistant according to an embodiment of this application. As shown in the figure, the local profile assistant 130 includes:

a sending module 1301, configured to send first information to an event management server, where the first information includes a target identifier;

a receiving module 1302, configured to receive a target event record that is obtained by the event management server through querying and that is sent by the event management server, where a group event identifier in the target event record matches the target identifier in the first information, and the group event identifier includes at least one eUICC firmware version and at least one issuer identifier; and a processing module 1303, configured to download an eUICC firmware version update package based on the target event record.

The sending module 1301 is further configured to send the eUICC firmware version update package to an eUICC, where the eUICC firmware version update package is used by the eUICC to update a firmware version of the eUICC.

Optionally, the target identifier includes a first target identifier of a first eUICC and a second target identifier of a second eUICC;

the receiving module 1302 is specifically configured to:
receive a first event record and a second event record that are obtained by the event management server through querying and that are sent by the event management server, where a group event identifier in the first event record matches the first target identifier, and a group event identifier in the second event record matches the second target identifier;

the processing module 1303 is specifically configured to:
download a first eUICC firmware version update package of the first eUICC based on the first event record; and
download a second eUICC firmware version update package of the second eUICC based on the second event record; and the sending module 1301 is specifically configured to:
send the first eUICC firmware version update package to the first eUICC, where the first eUICC firmware version update package is used by the first eUICC to update an eUICC firmware version of the first eUICC; and
send the second eUICC firmware version update package to the second eUICC, where the second eUICC firmware version update package is used by the second eUICC to update an eUICC firmware version of the second eUICC.

Optionally, the sending module 1301 is further configured to:
send the first event record to the first eUICC based on a first eUICC identifier; and
the sending module 1301 is further configured to:
send the second event record to the second eUICC based on the second eUICC identifier.

Optionally, when the processing module 1303 downloads the first eUICC firmware version update package of the first eUICC based on the first event record, the receiving module 1302 further receives the first eUICC identifier sent by an update server corresponding to the first eUICC;

when the processing module 1303 downloads the second eUICC firmware version update package of the second eUICC based on the second event record, the receiving module 1302 further receives the second eUICC identifier sent by an update server corresponding to the second eUICC; and the sending module 1301 is specifically configured to:
send the first eUICC firmware version update package to the first eUICC based on the first eUICC identifier; and send the second eUICC firmware version update package to the second eUICC based on the second eUICC identifier.

An embodiment of this application further provides a computer program, including a program instruction. When the program instruction is executed by a computer, the computer is enabled to perform the method in the embodiment corresponding to FIG. 4A and FIG. 4B, FIG. 5A and FIG. 5B, or FIG. 6A, FIG. 6B, and FIG. 6C. The computer program may be some of programs corresponding to the local profile assistant 130.

Figure 12:
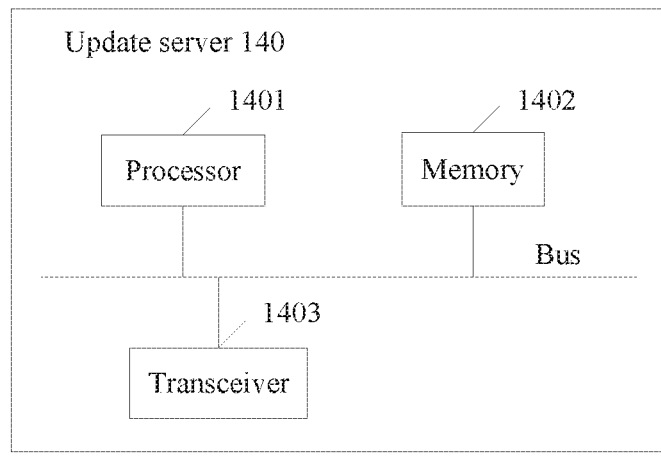
FIG. 12 is a schematic structural diagram of hardware of an update server according to an embodiment of this application.

In a possible implementation, the processing module 1103 may be a processor or a processing chip, the sending module 1101 and the receiving module 1102 may be a transceiver, and the update server may further include a memory, configured to store an event record and a computer instruction. The following describes an implementation of the update server in the embodiment corresponding to FIG. 9. FIG. 12 is a schematic structural diagram of hardware of an update server according to an embodiment of this application. The update server 140 includes a processor 1401, a memory 1402, and a transceiver 1402. The processor 1401, the memory 1402, and the transceiver 1402 are connected by using one or more communications buses 1404.

The processor 1401 is configured to support the update server in performing a corresponding function in the method for updating an eUICC firmware version in FIG. 2, FIG. 3, FIG. 5A and FIG. 5B, or FIG. 6A. FIG. 6B, and FIG. 6C. The processor 1401 may be a central processing unit (central processing unit, CPU), a network processor (network processor, NP), a hardware chip, or any combination thereof. The hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field-programmable gate array (field-programmable gate array, FPGA), generic array logic (generic array logic, GAL), or any combination thereof.

The memory 1402 is configured to store program code or the like. The memory 1402 may include a volatile memory (volatile memory) such as a random access memory (random access memory. RAM), or the memory 1402 may include a non-volatile memory (non-volatile memory) such as a read-only memory (read-only memory, ROM), a flash memory (flash memory), a hard disk drive (hard disk drive, HDD), or a solid-state drive (solid-state drive, SSD), or the memory 1402 may include a combination of the foregoing types of memories.

The transceiver 1403 is configured to receive and send data.

The processor 1401 may invoke the program code to perform the following operations:

sending an event registration request to an event management server, where the event registration request carries a group event identifier, the group event identifier includes at least one eUICC firmware version and at least one issuer identifier, and the event registration request is used to enable the event management server to: store the group event identifier in an event record, and send the event record to a terminal device when receiving first information that is sent by the terminal device and that matches the group event identifier.

It should be noted that the processor 1401 may further execute operations executed by the update server in the method shown in FIG. 3, FIG. 4A and FIG. 4B, FIG. 5A and FIG. 5B, or FIG. 6A, FIG. 6B, and FIG. 6C.

An embodiment of this application further provides a computer storage medium. The computer storage medium stores a computer program. The computer program includes a program instruction. When the program instruction is executed by a computer, the computer is enabled to perform the method in the embodiment corresponding to FIG. 3, FIG. 4A and FIG. 4B, FIG. 5A and FIG. 5B, or FIG. 6A, FIG. 6B, and FIG. 6C. The computer may be a part of the update server mentioned above.

An embodiment of this application further provides a computer program, including a program instruction. When the program instruction is executed by a computer, the computer is enabled to perform the method in the embodiment corresponding to FIG. 3. FIG. 4A and FIG. 4B, FIG. 5A and FIG. 5B, or FIG. 6A. FIG. 6B, and FIG. 6C. The computer program may be some of programs stored in the memory 1402 mentioned above.

Figure 13:
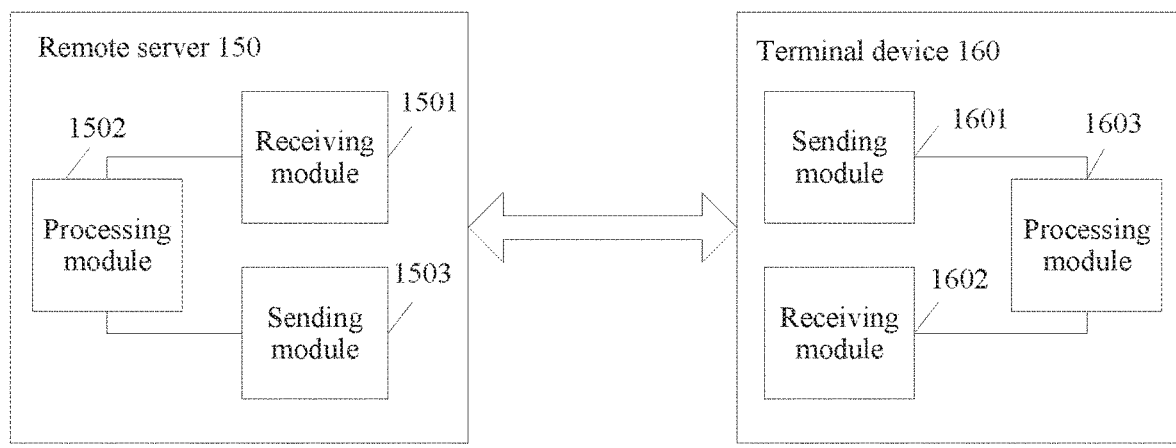
FIG. 13 is a schematic structural diagram of a system including a remote server and a terminal device according to an embodiment of this application.

FIG. 13 is a schematic structural diagram of a system including a remote server and a terminal device according to an embodiment of this application. As shown in the figure, there is a communication connection such as a Wi-Fi connection or a mobile data connection between a remote server 150 and a terminal device 160, so that data communication between the remote server 150 and the terminal device 160 can be implemented. Modules of the terminal device and remote server may be implemented by using hardware, software, or a combination of software and hardware, to implement the solutions of this application. A person skilled in the art should understand that the modules described in FIG. 13 may be combined or separated into some sub-blocks to implement the solutions of this application. Therefore, the described content in this application may support any possible combination or separation or further definition of the following modules.

As shown in FIG. 13, the update server 150 may include:

a receiving module 1501, configured to receive first eUICC information of a first eUICC of the terminal device 160 and second eUICC information of a second eUICC of the terminal device 160;

a processing module 1502, configured to determine target verification information based on the first eUICC information and the second eUICC information; and a sending module 1503, configured to send first authentication information to the terminal device 160, where the first authentication information includes the target verification information.

The receiving module 1501 is further configured to receive second authentication information sent by the terminal device 160 after the first authentication information is verified by the first eUICC and the second eUICC.

The processing module 1502 is further configured to verify the second authentication information based on the target verification information.

Optionally, the target verification information includes a target signature public key identifier, the first eUICC information includes a first signature public key identifier list of the first eUICC, and the second eUICC information includes a second signature public key identifier list of the second eUICC; and the processing module 1502 is specifically configured to:

select a first target signature public key identifier from the first signature public key identifier list, where the first target signature public key identifier is also in a local certificate issuer public key identifier list;

select a second target signature public key identifier from the second signature public key identifier list, where the second target signature public key identifier is also in the local certificate issuer public key identifier list; and determine the first target signature public key identifier and the second target signature public key identifier as target signature public key identifiers.

Optionally, the processing module 1502 is further configured to:

when the first signature public key identifier list and the second signature public key identifier list include a same signature public key identifier, determine the same signature public key identifier as the target signature public key identifier, where the same signature public key identifier is also in the local certificate issuer public key identifier list.

Optionally, the target verification information includes a target verification certificate, the first eUICC information includes a first verification public key identifier list of the first eUICC, and the second eUICC information includes a second verification public key identifier list of the second eUICC; and the processing module 1502 is specifically configured to:

select a first target verification public key identifier from the first verification public key identifier list, where the first target verification public key identifier is also in the local certificate issuer public key identifier list;

select a second target verification public key identifier from the second verification public key identifier list, where the second target verification public key identifier is also in the local certificate issuer public key identifier list; and determine a first target verification certificate corresponding to the first target verification public key identifier and a second target verification certificate corresponding to the second target verification public key identifier as target verification certificates.

Optionally, the processing module 1502 is further configured to:

when the first verification public key identifier list and the second verification public key identifier list include a same verification public key identifier, determine a verification certificate corresponding to the same verification public key identifier as the target verification certificate, where the same verification signature public key identifier is also in the local certificate issuer public key identifier list.

As shown in FIG. 13, the terminal device 160 may include:

a sending module 1601, configured to send first eUICC information of a first eUICC and second eUICC information of a second eUICC to the remote server; and a receiving module 1602, configured to receive first authentication information sent by the remote server, where the first authentication information includes target verification information.

The sending module 1601 is further configured to: when the first authentication information is verified the first eUICC and the second eUICC, send second authentication information to the remote server.

Optionally, the terminal device further includes a processing module 1603, configured to: instruct the sending module 1601 to send data, instruct the receiving module 1602 to receive data, and instruct the first eUICC and the second eUICC to verify the first authentication information.

Optionally, the target verification information includes a first target signature public key identifier and a second target signature public key identifier, the first target signature public key identifier is selected by the remote server from a first signature public key identifier list of the first eUICC, the first target signature public key identifier is also in a local certificate issuer public key identifier list of the remote server, the second target signature public key identifier is selected by the remote server from a second signature public key identifier list of the second eUICC, and the second target signature public key identifier is also in the local certificate issuer public key identifier list.

Optionally, the target verification information includes a target signature public key identifier, and the target signature public key identifier is in each of a first signature public key identifier list of the first eUICC, a second signature public key identifier list of the second eUICC, and a local certificate issuer public key identifier list of the remote server.

Optionally, the target verification information includes a first target verification certificate corresponding to a first target verification public key identifier and a second target verification certificate corresponding to a second target verification public key identifier, the first target verification public key identifier is selected by the remote server from a first verification public key identifier list of the first eUICC, the first target verification public key identifier is also in the local certificate issuer public key identifier list of the remote server, the second target verification public key identifier is selected by the remote server from a second verification public key identifier list of the second eUICC, and the second target verification public key identifier is also in the local certificate issuer public key identifier list.

Optionally, the target verification information includes a target verification certificate, and the target verification certificate is a verification certificate corresponding to a target verification public key identifier that is in each of the first verification public key identifier list of the first eUICC, the second verification public key identifier list of the second eUICC, and the local certificate issuer public key identifier list of the remote server.

It should be noted that for content and specific implementation of each module that are not mentioned in the embodiment corresponding to FIG. 13, refer to the embodiment of the method shown in FIG. 7 or FIG. 8A and FIG. 8B. Details are not described herein again.

In the system described in FIG. 13, simultaneous bidirectional authentication between the remote server and the two eUICCs of the terminal device can be implemented. This helps improve bidirectional authentication efficiency.

Figure 14:
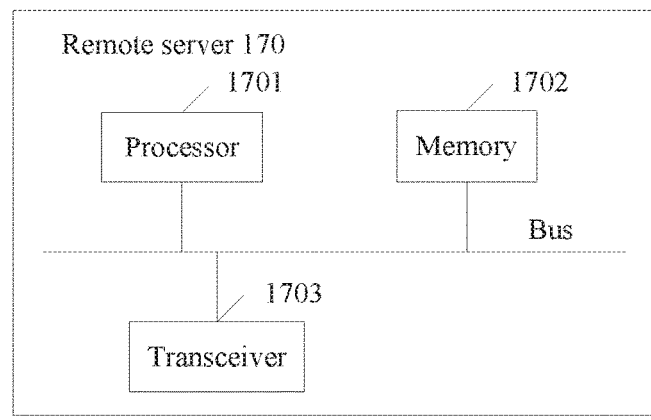
FIG. 14 is a schematic structural diagram of hardware of a remote server according to an embodiment of this application.

In a possible implementation, the processing module 1502 may be a processor or a processing chip, the receiving module 1501 and the sending module 1503 may be a transceiver, and the remote server may further include a memory. The following describes an implementation of the remote server in the system of FIG. 13. FIG. 14 is a schematic structural diagram of hardware of a remote server according to an embodiment of this application. The remote server 170 includes a processor 1701, a memory 1702, and a transceiver 1702. The processor 1701, the memory 1702, and the transceiver 1703 are connected by using one or more communications buses 1704.

The processor 1701 is configured to support the remote server in performing a corresponding function in the bidirectional authentication method in FIG. 7 or FIG. 8A and FIG. 8B. The processor 1701 may be a central processing unit (central processing unit, CPU), a network processor (network processor, NP), a hardware chip, or any combination thereof. The hardware chip may be an application-specific integrated circuit (application-specific integrated circuit, ASIC), a programmable logic device (programmable logic device, PLD), or a combination thereof. The PLD may be a complex programmable logic device (complex programmable logic device. CPLD), a field-programmable gate array (field-programmable gate array, FPGA), generic array logic (generic array logic, GAL), or any combination thereof.

The memory 1702 is configured to store program code or the like. The memory 1702 may include a volatile memory (volatile memory) such as a random access memory (random access memory, RAM for short), or the memory 1702 may include a non-volatile memory (non-volatile memory) such as a read-only memory (read-only memory, ROM for short), a flash memory (flash memory), a hard disk drive (hard disk drive, HDD), or a solid-state drive (solid-state drive, SSD), or the memory 1702 may include a combination of the foregoing types of memories.

The transceiver 1703 is configured to receive and send data.

The processor 1701 may invoke the program code to perform the following operations:

receiving first eUICC information of a first eUICC of a terminal device and second eUICC information of a second eUICC of the terminal device;

determining target verification information based on the first eUICC information and the second eUICC information;

sending first authentication information to the terminal device, where the first authentication information includes the target verification information;

receiving second authentication information sent by the terminal device after the first authentication information is verified by the first eUICC and the second eUICC; and verifying the second authentication information based on the target verification information.

It should be noted that the processor 1701 may further execute operations executed by the remote server in the method shown in FIG. 7 or FIG. 8A and FIG. 8B.

An embodiment of this application further provides a computer storage medium. The computer storage medium stores a computer program. The computer program includes a program instruction. When the program instruction is executed by a computer, the computer is enabled to perform the method in the embodiment corresponding to FIG. 7 or FIG. 8A and FIG. 8B. The computer may be a part of the remote server mentioned above.

An embodiment of this application further provides a computer program, including a program instruction. When the program instruction is executed by a computer, the computer is enabled to perform the method in the embodiment corresponding to FIG. 7 or FIG. 8A and FIG. 8B. The computer program may be some of programs stored in the memory 1702 mentioned above.

Figure 15:
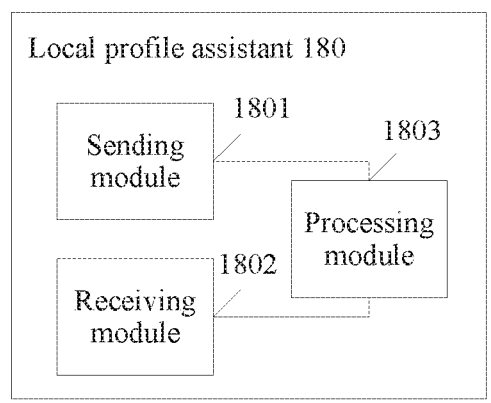
FIG. 15 is a schematic structural diagram of another local profile assistant according to an embodiment of this application.

In a possible implementation, the terminal device may include two eUICCs and a local profile assistant LPA. The local profile assistant LPA may be deployed on a hardware module of the terminal device as one or more software modules, for example, on a baseband chip, an application processor, or other hardware, or the local file assistant may be directly deployed on an eUICC. The local profile assistant LPA has a function of implementing interaction between an eUICC and the terminal device and interaction between the eUICC and a remote server. FIG. 15 is a schematic structural diagram of a local profile assistant according to an embodiment of this application. As shown in the figure, the local profile assistant 180 includes:

a sending module 1801, configured to send first eUICC information of a first eUICC and second eUICC information of a second eUICC to a remote server; and a receiving module 1802, configured to receive first authentication information sent by the remote server, where the first authentication information includes target verification information.

The sending module 1801 is further configured to: when the first authentication information is verified by the first eUICC and the second eUICC, send second authentication information to the remote server, where the second authentication information includes first authentication sub-information sent by the first eUICC and second authentication sub-information sent by the second eUICC.

Optionally, the receiving module 1802 is further configured to:

obtain the first eUICC information from the first eUICC; and obtain the second eUICC information from the second eUICC.

Optionally, the local profile assistant 180 further includes a processing module 1803;

the processing module 1803 is configured to obtain third authentication sub-information corresponding to the first eUICC from the first authentication information, and the sending module is further configured to send the third authentication sub-information to the first eUICC;

the receiving module 1802 is further configured to receive the first authentication sub-information that is sent by the first eUICC after the third authentication sub-information is verified by the first eUICC;

the processing module 1803 further obtains fourth authentication sub-information corresponding to the second eUICC from the first authentication information, and the sending module 1801 is further configured to send the fourth authentication sub-information to the second eUICC; and the receiving module 1802 is further configured to receive the second authentication sub-information that is sent by the second eUICC after the fourth authentication sub-information is verified by the second eUICC.

Optionally, the target verification information includes a first target signature public key identifier and a second target signature public key identifier, the first target signature public key identifier is selected by the remote server from a first signature public key identifier list of the first eUICC, the first target signature public key identifier is also in a local certificate issuer public key identifier list of the remote server, the second target signature public key identifier is selected by the remote server from a second signature public key identifier list of the second eUICC, and the second target signature public key identifier is also in the local certificate issuer public key identifier list; and the third authentication sub-information carries the first target signature public key identifier, and the fourth authentication sub-information carries the second target signature public key identifier.

Optionally, the target verification information includes a target signature public key identifier, and the target signature public key identifier is in each of a first signature public key identifier list of the first eUICC, a second signature public key identifier list of the second eUICC, and a local certificate issuer public key identifier list of the remote server; and both the third authentication sub-information and the fourth authentication sub-information carry the target signature public key identifier.

Optionally, the target verification information includes a first target verification certificate corresponding to a first target verification public key identifier and a second target verification certificate corresponding to a second target verification public key identifier, the first target verification public key identifier is selected by the remote server from a first verification public key identifier list of the first eUICC, the first target verification public key identifier is also in the local certificate issuer public key identifier list of the remote server, the second target verification public key identifier is selected by the remote server from a second verification public key identifier list of the second eUICC, and the second target verification public key identifier is also in the local certificate issuer public key identifier list; and the third authentication sub-information carries the first target verification certificate, and the fourth authentication sub-information carries the second target verification certificate.

Optionally, the target verification information includes a target verification certificate, and the target verification certificate is a verification certificate corresponding to a target verification public key identifier that is in each of a first verification public key identifier list of the first eUICC, a second verification public key identifier list of the second eUICC, and the local certificate issuer public key identifier list of the remote server.

both the third authentication sub-information and the fourth authentication sub-information carry the target verification certificate.

An embodiment of this application further provides a computer program, including a program instruction. When the program instruction is executed by a computer, the computer is enabled to perform the method in the embodiment corresponding to FIG. 7 or FIG. 8A and FIG. 8B. The computer program may be some of programs corresponding to the local profile assistant 180.

Figure 16:
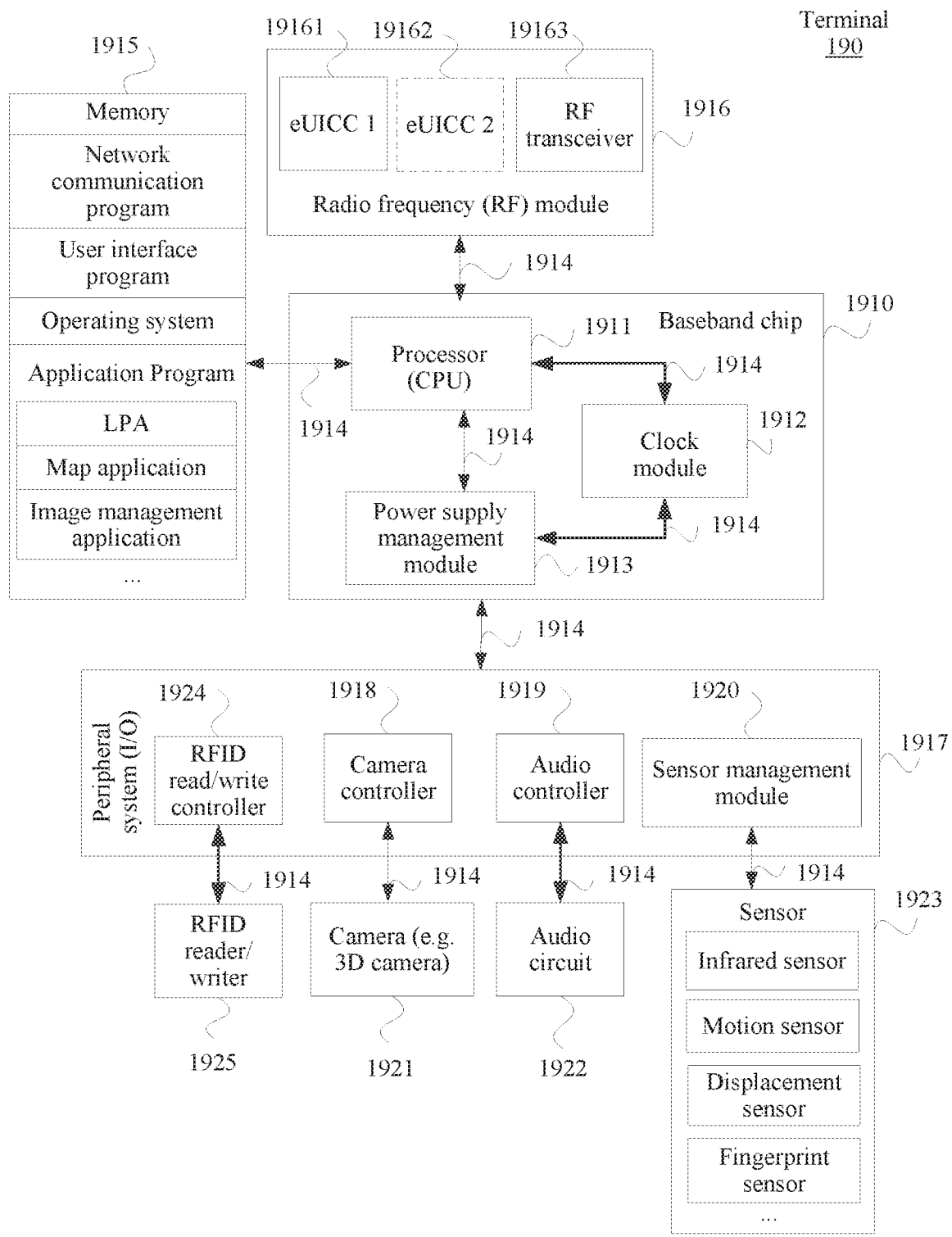
FIG. 16 is a structural block diagram of an implementation of a terminal device according to an embodiment of this application.

The following describes an implementation of the terminal device in the system of FIG. 9 or FIG. 13. FIG. 16 is a structural block diagram of an implementation of a terminal device. As shown in FIG. 16, a terminal device 190 may include a baseband chip 1910, a memory 1915 (one or more computer readable storage media), a radio frequency (RF) module 1916, and a peripheral system 1917. These components may communicate with each other on one or more communications buses 1919.

The peripheral system 1917 is mainly configured to implement an interaction function between the terminal device 190 and a user/an external environment, and mainly includes an input/output apparatus of the terminal device 190. In specific implementation, the peripheral system 1917 may include a camera controller 1918, an audio controller 1919, and a sensor management module 1920. The controllers may be coupled to corresponding peripheral devices respectively (for example, a camera 1921, an audio circuit 1922, and a sensor 1923). In some embodiments, the camera 1921 may be a 3D camera. In some embodiments, the sensor 1923 may be an infrared sensor, a fingerprint sensor, a displacement sensor, an energy consumption sensor, a temperature sensor, a humidity sensor, a light sensor, or the like. It should be noted that the peripheral system 1917 may further include another I/O peripheral. For example, the peripheral system 1917 further includes a radio frequency identification (Radio Frequency Identification, RFID) read/write controller 1924. The RFID read/write controller is coupled to an RFID reader/writer 1925.

The baseband chip 1910 may integrate and include a processor 1911, a clock module 1912, and a power supply management module 1913. The clock module 1912 integrated in the baseband chip 1910 is mainly configured to generate a clock required for data transmission and time sequence control for the processor 1911. The power supply management module 1913 integrated in the baseband chip 1910 is mainly configured to provide a stable and high-precision voltage for the processor 1911, the radio frequency module 1916, and the peripheral system 1917. In some embodiments, the processor may be a central processing unit (Center Processor Unit, CPU), an embedded micro control unit (Micro Controller Unit, MCU), an embedded micro processing unit (Micro Processor Unit, MPU), an embedded system on chip (System on Chip, SoC), or the like.

The radio frequency (RF) module 1916 is configured to receive and send a radio frequency signal, and mainly integrates a receiver and a transmitter of the terminal device 190. The radio frequency (RF) module 1916 communicates with a communications network and another communications device by using a radio frequency signal. In specific implementation, the radio frequency (RF) module 1916 may include but is not limited to at least one eUICC, an antenna system, an RF transceiver, one or more amplifiers, a tuner, one or more oscillators, a digital signal processor, a CODEC chip, a storage medium, and the like. In some embodiments, the radio frequency (RF) module 1916 may be implemented on a separate chip.

The memory 1915 is coupled to the processor 1911, and configured to store various software programs and/or a plurality of sets of commands. In specific implementation, the memory 1915 may include a high-speed random access memory, or may include a non-volatile memory, such as one or more magnetic disk storage devices, a flash memory device, or another non-volatile solid-state storage device. The memory 1915 may store an operating system (a system for short a system for short in the following description), for example, an embedded operating system such as Android, iOS, Windows, or Linux. The memory 1915 may further store a network communication program. The network communication program may be used to communicate with one or more additional devices, one or more terminal devices, and one or more network devices. The memory 1915 may further store a user interface program. The user interface program may vividly display content of an application program through a graphical operation interface, and receive, by using an input control such as a menu, a dialog box, and a button, a control operation performed by a user on the application program. The memory 1915 may further store one or more application programs including a local profile assistant LPA.

An embodiment of this application further provides a computer storage medium. The computer storage medium stores a computer program. The computer program includes a program instruction. When the program instruction is executed by a computer, the computer is enabled to perform the method in the embodiments corresponding to FIG. 2 to FIG. 4A and FIG. 4B, and FIG. 5A and FIG. 5B to FIG. 8A and FIG. 8B. The computer may be a part of the terminal device mentioned above.

An embodiment of this application further provides a computer program, including a program instruction. When the program instruction is executed by a computer, the computer is enabled to perform the method in the embodiments corresponding to FIG. 2 to FIG. 4A and FIG. 4B, and FIG. 5A and FIG. 5B to FIG. 8A and FIG. 8B. The computer program may be some of the programs stored in the memory 1915 mentioned above.

In an implementation process, steps in the foregoing methods can be implemented by using an integrated logical circuit of hardware in a processor, or by using instructions in a form of software. The steps of the methods disclosed with reference to the embodiments of this application may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, a register, or the like. The storage medium is located in a memory, and the processor executes instructions in the memory and completes the steps in the foregoing methods in combination with hardware of the processor. To avoid repetition, details are not described herein again.

It should be understood that the term "and/or" in this specification describes only an association relationship for describing associated objects and represents that three relationships may exist. For example, A and/or B may represent the following three cases: Only A exists, both A and B exist, and only B exists. In addition, the character "I" in this specification generally indicates an "or" relationship between the associated objects.

A person of ordinary skill in the art may be aware that, in combination with the embodiments disclosed in this specification, method steps and modules can be implemented by electronic hardware, computer software, or a combination thereof. To clearly describe the interchangeability between the hardware and the software, steps and compositions of each embodiment are generally described above based on functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and module, reference can be made to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the module division is merely logical function division and may be other division in actual implementation. For example, a plurality of modules or components may be combined or integrated into another system, or some features may be ignored or not performed. In addition, the displayed or discussed mutual couplings or direct couplings or communication connections may be implemented through some interfaces, and indirect couplings or communication connections between the apparatuses or modules may be electrical connections, mechanical connections, or connections in other forms.

The modules described as separate parts may or may not be physically separate, and parts displayed as modules may or may not be physical modules, may be located in one position, or may be distributed on a plurality of network modules. Some or all the modules may be selected based on actual needs to achieve the objectives of the solutions of the embodiments of this application.

In addition, function modules in the embodiments of this application may be integrated into one processing module, or each of the modules may exist alone physically, or two or more modules are integrated into one module. The integrated module may be implemented in a form of hardware, or may be implemented in a form of a software function module.

When the integrated module is implemented in the form of a software function module and sold or used as an independent product, the integrated module may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any modification or replacement readily figured out by a person skilled in the art within the technical scope disclosed in this application shall fall within the protection scope of this application. Therefore, the protection scope of this application shall be subject to the protection scope of the claims.

What is claimed is:

1. A method for updating an embedded universal integrated circuit card (eUICC) firmware version implemented by a subscription manager discovery service (SM-DS), the method comprising:
    receiving first information from a terminal device comprising an eUICC, wherein the first information comprises a target identifier;
    searching currently stored event records for a target event record, wherein a group event identifier in the target event record matches the target identifier, and wherein the group event identifier comprises a first eUICC firmware version and a first issuer identifier; and
    sending the target event record to the terminal device to enable the terminal device to download an eUICC firmware version update package.

2. The method of claim 1, wherein before receiving the first information, the method further comprises:
    receiving an event registration request from an update server, wherein the event registration request comprises the group event identifier; and
    storing the group event identifier in an event record based on the event registration request.

3. The method of claim 1, wherein the group event identifier further comprises a custom identifier or a country code.

4. The method of claim 3, wherein the custom identifier comprises additional issuer information or a personal identification number in a preset custom bit.

5. The method of claim 1, wherein the target identifier comprises at least one of a second eUICC firmware version, a second issuer identifier, a custom identifier, or a country code.

6. The method of claim 1, wherein the target identifier comprises a first target identifier of a first eUICC and a second target identifier of a second eUICC, and wherein the method further comprises:
    separately searching the currently stored event records for a first event record and a second event record, wherein a group event identifier in the first event record matches the first target identifier, and wherein a group event identifier in the second event record matches the second target identifier; and
    sending the first event record and the second event record to the terminal device, wherein the first event record enables the terminal device to download a first eUICC firmware version update package of the first eUICC, and wherein the second event record enables the terminal device to download a second eUICC firmware version update package of the second eUICC.

7. A method for updating an embedded universal integrated circuit card (eUICC) firmware version implemented by a terminal device comprising an eUICC, the method comprising:
    sending first information to an event management server, wherein the first information comprises a target identifier, and wherein the event management server comprises a subscription manager discovery service (SM-DS);
    receiving a target event record from the event management server, wherein a group event identifier in the target event record matches the target identifier in the first information, and wherein the group event identifier comprises a first eUICC firmware version and a first issuer identifier;
    downloading an eUICC firmware version update package based on the target event record; and
    updating a firmware version of the eUICC based on the eUICC firmware version update package.

8. The method of claim 7, wherein the group event identifier further comprises a custom identifier or a country code.

9. The method of claim 8, wherein the custom identifier comprises additional issuer information or a personal identification number in a preset custom bit.

10. The method of claim 7, wherein the target identifier comprises a second eUICC firmware version, a second issuer identifier, a custom identifier, or a country code.

11. The method of claim 7, wherein the target identifier comprises a first target identifier of a first eUICC and a second target identifier of a second eUICC, and wherein the method further comprises:
    receiving a first event record and a second event record from the event management server, wherein a group event identifier in the first event record matches the first target identifier, and wherein a group event identifier in the second event record matches the second target identifier, wherein downloading the eUICC firmware version update package based on the target event record comprises:
downloading a first eUICC firmware version update package of the first eUICC based on the first event record; and
downloading a second eUICC firmware version update package of the second eUICC based on the second event record, and wherein updating the firmware version of the eUICC based on the eUICC firmware version update package comprises:
updating a firmware version of the first eUICC based on the first eUICC firmware version update package; and
updating a firmware version of the second eUICC based on the second eUICC firmware version update package.

12. The method of claim 7, further comprising:
extracting an address of an update server from the target event record;
sending a current eUICC firmware version to the update server; and
receiving the eUICC firmware version update package from the update server based on the current eUICC firmware version.

13. A terminal device, comprising:
an embedded universal integrated circuit card (eUICC);
a transceiver coupled to the eUICC and configured to:
send first information to an event management server, wherein the first information comprises a target identifier, and wherein the event management server comprises a subscription manager discovery service (SM-DS);
receive a target event record from the event management server, wherein a group event identifier in the target event record matches the target identifier in the first information, and wherein the group event identifier comprises a first eUICC firmware version and a first issuer identifier;
a processor coupled to the transceiver and the eUICC and configured to:
download an eUICC firmware version update package based on the target event record; and
update a firmware version of the eUICC based on the eUICC firmware version update package.

14. The terminal device of claim 13, wherein the group event identifier further comprises a custom identifier or a country code.

15. The terminal device of claim 14, wherein the custom identifier comprises additional issuer information or a personal identification number in a preset custom bit.

16. The terminal device of claim 13, wherein the target identifier comprises at least one of a second eUICC firmware version, a second issuer identifier, a custom identifier, or a country code.

17. The terminal device of claim 13, wherein the target identifier comprises a first target identifier of a first eUICC and a second target identifier of a second eUICC, wherein the transceiver is further configured to receive a first event record and a second event record from the event management server, wherein a group event identifier in the first event record matches the first target identifier, wherein a group event identifier in the second event record matches the second target identifier, and wherein the processor is further configured to:
download a first eUICC firmware version update package of the first eUICC based on the first event record;
download a second eUICC firmware version update package of the second eUICC based on the second event record;
update a firmware version of the first eUICC based on the first eUICC firmware version update package; and
update a firmware version of the second eUICC based on the second eUICC firmware version update package.

18. The terminal device of claim 13, wherein the processor is further configured to extract an address of an update server from the target event record, and wherein the transceiver is further configured to:
send a current eUICC firmware version to the update server; and
receive the eUICC firmware version update package from the update server based on the current eUICC firmware version.

19. The terminal device of claim 18, wherein the transceiver is further configured to:
send second information to the update server, wherein the second information comprises the target identifier; and
receive the eUICC firmware version update package from the update server based on the current eUICC firmware version when the target identifier in the second information matches a group event identifier stored in the update server.

20. The terminal device of claim 18, wherein the processor is further configured to update an eUICC firmware version in eUICC information.

* * * * *